US010572027B2

(12) United States Patent
Poupyrev et al.

(10) Patent No.: US 10,572,027 B2
(45) Date of Patent: *Feb. 25, 2020

(54) GESTURE DETECTION AND INTERACTIONS

(71) Applicant: Google LLC, Mountain View, CA (US)

(72) Inventors: Ivan Poupyrev, Sunnyvale, CA (US); Carsten Schwesig, San Francisco, CA (US); Jack Schulze, London (GB); Timo Arnall, London (GB); Durrell Grant Bevington Bishop, London (GB)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/238,464

(22) Filed: Jan. 2, 2019

(65) Prior Publication Data
US 2019/0138109 A1 May 9, 2019

Related U.S. Application Data

(63) Continuation of application No. 14/874,955, filed on Oct. 5, 2015, now Pat. No. 10,203,763.
(Continued)

(51) Int. Cl.
*G06F 3/045* (2006.01)
*G06F 3/01* (2006.01)
(Continued)

(52) U.S. Cl.
CPC .............. *G06F 3/017* (2013.01); *G06F 1/163* (2013.01); *G06F 1/1626* (2013.01);
(Continued)

(58) Field of Classification Search
USPC .......................... 345/173, 174, 619, 156, 179
See application file for complete search history.

(56) References Cited

U.S. PATENT DOCUMENTS

| 3,610,874 A | 10/1971 | Gagliano |
| 3,752,017 A | 8/1973 | Lloyd et al. |

(Continued)

FOREIGN PATENT DOCUMENTS

| CN | 202887794 | 4/2013 |
| CN | 102660988 | 3/2014 |

(Continued)

OTHER PUBLICATIONS

"Advisory Action", U.S. Appl. No. 14/504,139, dated Aug. 28, 2017, 3 pages.
(Continued)

*Primary Examiner* — Thuy N Pardo
(74) *Attorney, Agent, or Firm* — Colby Nipper PLLC

(57) ABSTRACT

Gesture detection and interaction techniques are described. Object detection used to support the gestures may be accomplished in a variety of ways, such as by using radio waves as part of a radar technique. In a first example, the techniques are implemented such that one hand of a user sets a context for a gesture that is defined by another hand of the user. In another example, a gesture recognition mode is utilized. In yet another example, detection of distance is used such that the same motions may be used to different between operations performed. In a further example, split gestures are supported. In another instance, entry into a gesture recognition mode may be implemented through touch and then recognized through three-dimensional orientation and motion of that hand or another.

42 Claims, 16 Drawing Sheets

Related U.S. Application Data

(60) Provisional application No. 62/167,209, filed on May 27, 2015.

(51) Int. Cl.

| | | |
|---|---|---|
| *G06F 3/0484* | (2013.01) | |
| *G06F 3/0485* | (2013.01) | |
| *G06F 1/16* | (2006.01) | |
| *G06F 3/0482* | (2013.01) | |
| *G06F 3/041* | (2006.01) | |
| *G06F 3/0488* | (2013.01) | |
| *G06K 9/00* | (2006.01) | |

(52) U.S. Cl.
CPC ............ *G06F 1/1684* (2013.01); *G06F 3/011* (2013.01); *G06F 3/0416* (2013.01); *G06F 3/0482* (2013.01); *G06F 3/0485* (2013.01); *G06F 3/04845* (2013.01); *G06F 3/04883* (2013.01); *G06K 9/00355* (2013.01); *G06F 2203/0381* (2013.01)

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,121,124 A | 6/1992 | Spivey et al. |
| 5,298,715 A | 3/1994 | Chalco et al. |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,080,690 A | 6/2000 | Lebby et al. |
| 6,101,431 A | 8/2000 | Niwa et al. |
| 6,210,771 B1 | 4/2001 | Post et al. |
| 6,254,544 B1 | 7/2001 | Hayashi |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,860,602 B2 | 10/2014 | Nohara et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | Desalvo et al. |
| 9,229,102 B2 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B1 | 5/2016 | Heller et al. |
| 9,508,141 B2 | 11/2016 | Khachaturian et al. |
| 9,511,877 B2 | 12/2016 | Masson |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |

(56) References Cited

U.S. PATENT DOCUMENTS

| | | |
|---|---|---|
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 10,073,590 B2 | 9/2018 | Dascola et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1* | 6/2006 | Westerman ......... G06F 3/04883 345/173 |
| 2006/0136997 A1 | 6/2006 | Telek et al. |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0024438 A1 | 1/2008 | Collins et al. |
| 2008/0039731 A1 | 2/2008 | McCombie et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0050133 A1 | 2/2010 | Nishihara et al. |
| 2010/0053151 A1 | 3/2010 | Marti et al. |
| 2010/0065320 A1 | 3/2010 | Urano |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |

(56) References Cited

U.S. PATENT DOCUMENTS

| | | |
|---|---|---|
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0146950 A1 | 6/2012 | Park et al. |
| 2012/0150493 A1 | 6/2012 | Casey et al. |
| 2012/0154313 A1* | 6/2012 | Au .................. G06F 3/04883 345/173 |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0102217 A1 | 4/2013 | Jeon |
| 2013/0104084 A1 | 4/2013 | Mlyniec et al. |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1* | 6/2013 | Aubauer ............... G06F 3/0416 345/619 |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1* | 2/2014 | Heim .................. G06K 9/00335 382/103 |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0145955 A1 | 5/2014 | Gomez et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1* | 10/2014 | Lapp .................. G06F 3/04886 715/835 |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368441 A1 | 12/2014 | Touloumtzis |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0223733 A1 | 8/2015 | Al-Alusi |
| 2015/0226004 A1 | 8/2015 | Thompson |
| 2015/0256763 A1 | 9/2015 | Niemi |
| 2015/0261320 A1 | 9/2015 | Gerald |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0287187 A1 | 10/2015 | Redtel |
| 2015/0312041 A1 | 10/2015 | Choi |
| 2015/0314780 A1 | 11/2015 | Stenneth et al. |

(56) References Cited

U.S. PATENT DOCUMENTS

| | | |
|---|---|---|
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346820 A1 | 12/2015 | Poupyrev et al. |
| 2015/0350902 A1 | 12/2015 | Baxley et al. |
| 2015/0351703 A1 | 12/2015 | Phillips et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarczyk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1* | 6/2016 | Jung .................... G06F 3/0488 715/856 |
| 2016/0171293 A1* | 6/2016 | Li ..................... G06K 9/00355 382/103 |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0125940 A1 | 5/2017 | Karagozler et al. |
| 2017/0192523 A1 | 7/2017 | Poupyrev |
| 2017/0196513 A1 | 7/2017 | Longinotti-Buitoni et al. |
| 2017/0231089 A1 | 8/2017 | Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1* | 4/2018 | Gribetz ................ G02B 27/017 345/173 |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0196527 A1 | 7/2018 | Poupyrev et al. |
| 2018/0321841 A1* | 11/2018 | Lapp .................. G06F 3/04886 345/174 |
| 2019/0033981 A1 | 1/2019 | Poupyrev |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1* | 9/2019 | Gribetz ................ G06F 3/013 345/179 |
| 2019/0321719 A1 | 10/2019 | Gillian et al. |
| 2019/0391667 A1 | 12/2019 | Poupyrev |
| 2019/0394884 A1 | 12/2019 | Karagozler et al. |

FOREIGN PATENT DOCUMENTS

| | | |
|---|---|---|
| CN | 103355860 | 1/2016 |
| DE | 102011075725 | 11/2012 |
| DE | 102013201359 | 7/2014 |
| EP | 0161895 | 11/1985 |
| EP | 1815788 | 8/2007 |
| EP | 2417908 | 2/2012 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | 2003280049 | 10/2003 |
| JP | 2006234716 | 9/2006 |
| JP | 2010049583 | 3/2010 |
| JP | 2011003202 | 1/2011 |
| JP | 2011102457 | 5/2011 |
| JP | 2014503873 | 2/2014 |
| WO | 9001895 | 3/1990 |
| WO | 0130123 | 4/2001 |
| WO | 2001027855 | 4/2001 |
| WO | 0175778 | 10/2001 |
| WO | 2002082999 | 10/2002 |
| WO | 2004004557 | 1/2004 |
| WO | 2004053601 | 6/2004 |
| WO | 2005033387 | 4/2005 |
| WO | 2007125298 | 11/2007 |
| WO | 2008061385 | 5/2008 |
| WO | 2009032073 | 3/2009 |
| WO | 2009083467 | 7/2009 |
| WO | 2010032173 | 3/2010 |
| WO | 2012026013 | 3/2012 |
| WO | 2012152476 | 11/2012 |
| WO | 2013082806 | 6/2013 |
| WO | 2013084108 | 6/2013 |
| WO | 2013186696 | 12/2013 |
| WO | 2013191657 | 12/2013 |
| WO | 2013192166 | 12/2013 |
| WO | 2014019085 | 2/2014 |
| WO | 2014116968 | 7/2014 |
| WO | 2014124520 | 8/2014 |
| WO | 2014136027 | 9/2014 |
| WO | 2014138280 | 9/2014 |
| WO | 2014160893 | 10/2014 |
| WO | 2014165476 | 10/2014 |
| WO | 2014204323 | 12/2014 |
| WO | 2015017931 | 2/2015 |
| WO | 2015022671 | 2/2015 |
| WO | 2015149049 | 10/2015 |
| WO | 2016053624 | 4/2016 |
| WO | 2016118534 | 7/2016 |
| WO | 2016154560 | 9/2016 |

(56) References Cited

FOREIGN PATENT DOCUMENTS

| WO | 2016154568 | 9/2016 |
|---|---|---|
| WO | 2016176471 | 11/2016 |
| WO | 2016176600 | 11/2016 |
| WO | 2016176606 | 11/2016 |
| WO | 2016178797 | 11/2016 |
| WO | 2017019299 | 2/2017 |
| WO | 2017062566 | 4/2017 |
| WO | 2017079484 | 5/2017 |
| WO | 20170200949 | 11/2017 |
| WO | 2018106306 | 6/2018 |

OTHER PUBLICATIONS

"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Cardiio", Retrieved From: <http://www.cardiio.com/> Apr. 15, 2015 App Information Retrieved From:<https://itunes.apple.com/us/app/cardiio-touchless-camera-pulse/id542891434?ls=1&mt=8>Apr. 15, 2015, Feb. 24, 2015, 6 pages.
"Clever Toilet Checks on Your Health", CNN.Com; Technology, Jun. 28, 2005, 2 pages.
"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"Corrected Notice of Allowance", U.S. Appl. No. 15/362,359, dated Sep. 17, 2018, 10 pages.
"Corrected Notice of Allowance", U.S. Appl. No. 14/582,896, dated Dec. 19, 2016, 2 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Corrected Notice of Allowance", U.S. Appl. No. 14/312,486, dated Oct. 28, 2016, 4 pages.
"Corrected Notice of Allowance", U.S. Appl. No. 14/312,486, dated Jan. 23, 2017, 4 pages.
"Extended European Search Report", EP Application No. 15170577.9, dated Nov. 5, 2015, 12 pages.
"Final Office Action", U.S. Appl. No. 14/504,061, dated Mar. 9, 2016, 10 pages.
"Final Office Action", U.S. Appl. No. 14/681,625, dated Dec. 7, 2016, 10 pages.
"Final Office Action", U.S. Appl. No. 15/398,147, dated Jun. 30, 2017, 11 pages.
"Final Office Action", U.S. Appl. No. 14/959,799, dated Jul. 19, 2017, 12 pages.
"Final Office Action", U.S. Appl. No. 15/595,649, dated May 23, 2018, 13 pages.
"Final Office Action", U.S. Appl. No. 14/715,454, dated Sep. 7, 2017, 14 pages.
"Final Office Action", U.S. Appl. No. 14/504,139, dated May 1, 2018, 14 pages.
"Final Office Action", U.S. Appl. No. 15/142,619, dated Feb. 8, 2018, 15 pages.
"Final Office Action", U.S. Appl. No. 14/504,121, dated Aug. 8, 2017, 16 pages.
"Final Office Action", U.S. Appl. No. 15/142,689, dated Jun. 1, 2018, 16 pages.
"Final Office Action", U.S. Appl. No. 14/959,799, dated Jan. 4, 2018, 17 pages.
"Final Office Action", U.S. Appl. No. 14/518,863, dated May 15, 2017, 18 pages.
"Final Office Action", U.S. Appl. No. 14/959,901, dated Aug. 25, 2017, 19 pages.
"Final Office Action", U.S. Appl. No. 15/093,533, dated Mar. 21, 2018, 19 pages.
"Final Office Action", U.S. Appl. No. 14/518,863, dated Apr. 5, 2018, 21 pages.
"Final Office Action", U.S. Appl. No. 14/959,901, dated Jun. 15, 2018, 21 pages.
"Final Office Action", U.S. Appl. No. 14/599,954, dated Aug. 10, 2016, 23 pages.
"Final Office Action", U.S. Appl. No. 14/504,038, dated Sep. 27, 2016, 23 pages.
"Final Office Action", U.S. Appl. No. 14/504,121, dated Jul. 9, 2018, 23 pages.
"Final Office Action", U.S. Appl. No. 15/286,152, dated Jun. 26, 2018, 25 pages.
"Final Office Action", U.S. Appl. No. 15/403,066, dated Oct. 5, 2017, 31 pages.
"Final Office Action", U.S. Appl. No. 15/267,181, dated Jun. 7, 2018, 31 pages.
"Final Office Action", U.S. Appl. No. 14/312,486, dated Jun. 3, 2016, 32 pages.
"Final Office Action", U.S. Appl. No. 15/166,198, dated Sep. 27, 2018, 33 pages.
"Final Office Action", U.S. Appl. No. 14/715,793, dated Sep. 12, 2017, 7 pages.
"Final Office Action", U.S. Appl. No. 14/874,955, dated Jun. 30, 2017, 9 pages.
"Final Office Action", U.S. Appl. No. 14/874,955, dated Jun. 11, 2018, 9 pages.
"First Action Interview OA", U.S. Appl. No. 14/715,793, dated Jun. 21, 2017, 3 pages.
"First Action Interview Office Action", U.S. Appl. No. 14/959,901, dated Apr. 14, 2017, 3 pages.
"First Action Interview Office Action", U.S. Appl. No. 15/286,152, dated Mar. 1, 2018, 5 pages.
"First Action Interview Office Action", U.S. Appl. No. 15/166,198, dated Apr. 25, 2018, 8 pages.
"First Action Interview Pilot Program Pre-Interview Communication", U.S. Appl. No. 14/731,195, dated Aug. 1, 2017, 3 pages.
"Foreign Office Action", KR Application No. 10-2016-7036023, dated Aug. 11, 2017, 10 pages.
"Foreign Office Action", JP Application No. 2016-563979, dated Sep. 21, 2017, 15 pages.
"Foreign Office Action", Chinese Application No. 201721290290.3, dated Mar. 9, 2018, 2 pages.
"Foreign Office Action", Chinese Application No. 201721290290.3, dated Jun. 6, 2018, 3 pages.
"Foreign Office Action", KR Application No. 10-2016-7035397, dated Sep. 20, 2017, 5 pages.
"Foreign Office Action", EP Application No. 15170577.9, dated May 30, 2017, 7 pages.
"Foreign Office Action", JP Application No. 2016567813, dated Sep. 22, 2017, 8 pages.
"Foreign Office Action", KR Application No. 10-2016-7032967, English Translation, Sep. 14, 2017, 4 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Preliminary Report on Patentability", Application No. PCT/US2015/030388, dated Dec. 15, 2016, 12 pages.
"International Preliminary Report on Patentability", Application No. PCT/US2015/043963, dated Feb. 16, 2017, 12 pages.
"International Preliminary Report on Patentability", Application No. PCT/US2015/050903, dated Apr. 13, 2017, 12 pages.
"International Preliminary Report on Patentability", Application No. PCT/US2015/043949, dated Feb. 16, 2017, 13 pages.
"International Preliminary Report on Patentability", PCT Application No. PCT/US2016/026756, dated Oct. 19, 2017, 8 pages.

(56) References Cited

OTHER PUBLICATIONS

"International Preliminary Report on Patentability", Application No. PCT/US2015/044774, dated Mar. 2, 2017, 8 pages.
"International Search Report and Written Opinion", Application No. PCT/US2016/060399, dated Jan. 30, 2017, 11 pages.
"International Search Report and Written Opinion", Application No. PCT/US2015/044774, dated Nov. 3, 2015, 12 pages.
"International Search Report and Written Opinion", Application No. PCT/US2016/042013, dated Oct. 26, 2016, 12 pages.
"International Search Report and Written Opinion", Application No. PCT/US2016/062082, dated Feb. 23, 2017, 12 pages.
"International Search Report and Written Opinion", PCT/US2017/047691, dated Nov. 16, 2017, 13 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/055671, dated Dec. 1, 2016, 14 pages.
"International Search Report and Written Opinion", Application No. PCT/US2016/030177, dated Aug. 2, 2016, 15 pages.
"International Search Report and Written Opinion", PCT Application No. PCT/US2017/051663, dated Nov. 29, 2017, 16 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/043949, dated Dec. 1, 2015, 18 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2016/063874, dated May 11, 2017, 19 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, dated Feb. 3, 2017, 2 pages.
"Non-Final Office Action", U.S. Appl. No. 15/286,837, dated Oct. 26, 2018, 10 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Non-Final Office Action", U.S. Appl. No. 14/504,139, dated Oct. 18, 2017, 12 pages.
"Non-Final Office Action", U.S. Appl. No. 14/666,155, dated Feb. 3, 2017, 12 pages.
"Non-Final Office Action", U.S. Appl. No. 14/504,121, dated Jan. 9, 2017, 13 pages.
"Non-Final Office Action", U.S. Appl. No. 14/959,730, dated Jun. 23, 2017, 14 pages.
"Non-Final Office Action", U.S. Appl. No. 14/862,409, dated Jun. 22, 2017, 15 pages.
"Non-Final Office Action", U.S. Appl. No. 14/930,220, dated Sep. 14, 2016, 15 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Non-Final Office Action", U.S. Appl. No. 14/720,632, dated Jun. 14, 2017, 16 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/595,649, dated Oct. 31, 2017, 16 pages.
"Non-Final Office Action", U.S. Appl. No. 14/504,139, dated Oct. 31, 2018, 16 pages.
"Non-Final Office Action", U.S. Appl. No. 14/518,863, dated Oct. 14, 2016, 16 pages.
"Non-Final Office Action", U.S. Appl. No. 14/599,954, dated Jan. 26, 2017, 16 pages.
"Non-Final Office Action", U.S. Appl. No. 14/862,409, dated Dec. 14, 2017, 17 pages.
"Non-Final Office Action", U.S. Appl. No. 14/599,954, dated Feb. 2, 2016, 17 pages.
"Non-Final Office Action", U.S. Appl. No. 15/287,253, dated Apr. 5, 2018, 17 pages.
"Non-Final Office Action", U.S. Appl. No. 15/093,533, dated Aug. 24, 2017, 18 pages.
"Non-Final Office Action", U.S. Appl. No. 15/142,689, dated Oct. 4, 2017, 18 pages.
"Non-Final Office Action", U.S. Appl. No. 15/287,308, dated Oct. 15, 2018, 18 pages.
"Non-Final Office Action", U.S. Appl. No. 15/286,537, dated Nov. 19, 2018, 18 pages.
"Non-Final Office Action", U.S. Appl. No. 14/504,121, dated Jan. 2, 2018, 19 pages.
"Non-Final Office Action", U.S. Appl. No. 15/287,253, dated Sep. 7, 2018, 20 pages.
"Non-Final Office Action", U.S. Appl. No. 14/518,863, dated Sep. 29, 2017, 20 pages.
"Non-Final Office Action", U.S. Appl. No. 14/959,901, dated Jan. 8, 2018, 21 pages.
"Non-Final Office Action", U.S. Appl. No. 14/959,901, dated Oct. 11, 2018, 22 pages.
"Non-Final Office Action", U.S. Appl. No. 14/504,038, dated Feb. 26, 2016, 22 pages.
"Non-Final Office Action", U.S. Appl. No. 14/312,486, dated Oct. 23, 2015, 25 pages.
"Non-Final Office Action", U.S. Appl. No. 15/286,152, dated Oct. 19, 2018, 27 pages.
"Non-Final Office Action", U.S. Appl. No. 15/267,181, dated Feb. 8, 2018, 29 pages.
"Non-Final Office Action", U.S. Appl. No. 15/403,066, dated May 4, 2017, 31 pages.
"Non-Final Office Action", U.S. Appl. No. 14/699,181, dated Oct. 18, 2017, 33 pages.
"Non-Final Office Action", U.S. Appl. No. 14/504,038, dated Mar. 22, 2017, 33 pages.
"Non-Final Office Action", U.S. Appl. No. 15/398,147, dated Sep. 8, 2017, 7 pages.
"Non-Final Office Action", U.S. Appl. No. 14/874,955, dated Feb. 8, 2018, 7 pages.
"Non-Final Office Action", U.S. Appl. No. 14/681,625, dated Mar. 6, 2017, 7 pages.
"Non-Final Office Action", U.S. Appl. No. 15/586,174, dated Jun. 18, 2018, 7 pages.
"Non-Final Office Action", U.S. Appl. No. 14/504,061, dated Nov. 4, 2015, 8 pages.
"Non-Final Office Action", U.S. Appl. No. 14/874,955, dated Feb. 27, 2017, 8 pages.
"Non-Final Office Action", U.S. Appl. No. 14/582,896, dated Jun. 29, 2016, 9 pages.
"Non-Final Office Action", U.S. Appl. No. 14/681,625, dated Aug. 12, 2016, 9 pages.
"Non-Final Office Action", U.S. Appl. No. 14/666,155, dated Aug. 24, 2016, 9 pages.
"Non-Final Office Action", U.S. Appl. No. 14/513,875, dated Feb. 21, 2017, 9 pages.

(56) References Cited

OTHER PUBLICATIONS

"Non-Invasive Quantification of Peripheral Arterial Volume Distensibilitiy and its Non-Linear Relationship with Arterial Pressure", Journal of Biomechanics, Pergamon Press, vol. 42, No. 8; as cited in the search report for PCT/US2016/013968 citing the whole document, but in particular the abstract, May 29, 2009, 2 pages.
"Notice of Allowance", U.S. Appl. No. 14/599,954, dated May 24, 2017, 11 pages.
"Notice of Allowance", U.S. Appl. No. 14/312,486, dated Oct. 7, 2016, 15 pages.
"Notice of Allowance", U.S. Appl. No. 14/504,038, dated Aug. 7, 2017, 17 pages.
"Notice of Allowance", U.S. Appl. No. 15/403,066, dated Jan. 8, 2018, 18 pages.
"Notice of Allowance", U.S. Appl. No. 15/287,200, dated Nov. 6, 2018, 19 pages.
"Notice of Allowance", U.S. Appl. No. 14/582,896, dated Nov. 7, 2016, 5 pages.
"Notice of Allowance", U.S. Appl. No. 15/586,174, dated Sep. 24, 2018, 5 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.
"Notice of Allowance", U.S. Appl. No. 14/874,955, dated Oct. 20, 2017, 7 pages.
"Notice of Allowance", U.S. Appl. No. 14/504,061, dated Sep. 12, 2016, 7 pages.
"Notice of Allowance", U.S. Appl. No. 14/494,863, dated May 30, 2017, 7 pages.
"Notice of Allowance", U.S. Appl. No. 14/681,625, dated Jun. 7, 2017, 7 pages.
"Notice of Allowance", U.S. Appl. No. 14/862,409, dated Jun. 6, 2018, 7 pages.
"Notice of Allowance", U.S. Appl. No. 15/362,359, dated Aug. 3, 2018, 8 pages.
"Notice of Allowance", U.S. Appl. No. 14/681,625, dated Oct. 23, 2017, 8 pages.
"Notice of Allowance", U.S. Appl. No. 14/874,955, dated Oct. 4, 2018, 8 pages.
"Notice of Allowance", U.S. Appl. No. 15/398,147, dated Nov. 15, 2017, 8 pages.
"Notice of Allowance", U.S. Appl. No. 14/959,730, dated Feb. 22, 2018, 8 pages.
"Notice of Allowance", U.S. Appl. No. 14/930,220, dated Feb. 2, 2017, 8 pages.
"Notice of Allowance", U.S. Appl. No. 15/595,649, dated Sep. 14, 2018, 8 pages.
"Notice of Allowance", U.S. Appl. No. 15/343,067, dated Jul. 27, 2017, 9 pages.
"Notice of Allowance", U.S. Appl. No. 15/142,689, dated Oct. 30, 2018, 9 pages.
"Notice of Allowance", U.S. Appl. No. 15/142,619, dated Aug. 13, 2018, 9 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 15/287,359, dated Jul. 24, 2018, 2 pages.
"Pre-Interview Communication", U.S. Appl. No. 14/513,875, dated Oct. 21, 2016, 3 pages.
"Pre-Interview Communication", U.S. Appl. No. 14/959,901, dated Feb. 10, 2017, 3 pages.
"Pre-Interview Communication", U.S. Appl. No. 14/959,730, dated Feb. 15, 2017, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Communication", U.S. Appl. No. 15/343,067, dated Apr. 19, 2017, 3 pages.
"Pre-Interview Communication", U.S. Appl. No. 15/286,495, dated Sep. 10, 2018, 4 pages.
"Pre-Interview Communication", U.S. Appl. No. 15/362,359, dated May 17, 2018, 4 pages.
"Pre-Interview Communication", U.S. Appl. No. 14/494,863, dated Jan. 27, 2017, 5 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Pre-Interview Office Action", U.S. Appl. No. 14/862,409, dated Sep. 15, 2017, 16 pages.
"Preliminary Report on Patentability", PCT Application No. PCT/US2016/030185, dated Nov. 9, 2017, 16 pages.
"Pressure-Volume Loop Analysis in Cardiology", retrieved from https://en.wikipedia.org/w/index.php?title=Pressure-volumeloopanalysisincardiology&oldid=636928657 on Sep. 23, 2017; Obtained per link provided in search report from PCT/US2016/01398 dated Jul. 28, 2016, Dec. 6, 2014, 10 pages.
"Restriction Requirement", U.S. Appl. No. 15/362,359, dated Jan. 8, 2018, 5 pages.
"Restriction Requirement", U.S. Appl. No. 14/666,155, dated Jul. 22, 2016, 5 pages.
"Restriction Requirement", U.S. Appl. No. 15/286,537, dated Aug. 27, 2018, 8 pages.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
"Written Opinion", PCT Application No. PCT/US2016/030185, dated Nov. 3, 2016, 15 pages.
"Written Opinion", PCT Application No. PCT/US2017/032733, dated Jul. 24, 2017, 5 pages.
"Written Opinion", PCT Application No. PCT/US2017/032733, dated Jul. 26, 2017, 5 pages.
"Written Opinion", PCT Application No. PCT/US2016/042013, dated Feb. 2, 2017, 6 pages.
"Written Opinion", PCT Application No. PCT/US2016/060399, dated May 11, 2017, 6 pages.
"Written Opinion", PCT Application No. PCT/US2016/026756, dated Nov. 10, 2016, 7 pages.
"Written Opinion", PCT Application No. PCT/US2016/055671, Apr. 13, 2017, 8 pages.
"Written Opinion", PCT Application No. PCT/US2017/051663, dated Oct. 12, 2018, 8 pages.
"Written Opinion", PCT Application PCT/US2016/013968, dated Jul. 28, 2016, 9 pages.
"Written Opinion", PCT Application No. PCT/US2016/030177, dated Nov. 3, 2016, 9 pages.
Arbabian, Amin et al., "A 94GHz mm-Wave to Baseband Pulsed-Radar for Imaging and Gesture Recognition", 2012 IEEE, 2012 Symposium on VLSI Circuits Digest of Technical Papers, Jan. 1, 2012, 2 pages.
Balakrishnan, Guha et al., "Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Bondade, Rajdeep et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Cheng, Jingyuan "Smart Textiles: From Niche to Mainstream", IEEE Pervasive Computing, pp. 81-84.
Couderc, Jean-Philippe et al., "Detection of Atrial Fibrillation using Contactless Facial Video Monitoring", In Proceedings: Heart Rhythm

(56) References Cited

OTHER PUBLICATIONS

Society, vol. 12, Issue 1 Available at: <http://www.heartrhythmjournal.com/article/S1547-5271(14)00924-2/pdf>, 7 pages.
Espina, Javier et al., "Wireless Body Sensor Network for Continuous Cuff-less Blood Pressure Monitoring", International Summer School on Medical Devices and Biosensors, 2006, 5 pages.
Fan, Tenglong et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Farringdon, Jonny et al., "Wearable Sensor Badge & Sensor Jacket for Context Awareness", Third International Symposium on Wearable Computers, 7 pages.
Godana, Bruhtesfa E. "Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
Gurbuz, Sevgi Z. et al., "Detection and Identification of Human Targets in Radar Data", Proc. SPIE 6567, Signal Processing, Sensor Fusion, and Target Recognition XVI, 656701, May 7, 2007, 12 pages.
He, David D. "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, 137 pages.
Holleis, Paul et al., "Evaluating Capacitive Touch Input on Clothes", Proceedings of the 10th International Conference on Human Computer Interaction, Jan. 1, 2008, 10 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 on Jul. 28, 2016, Sep. 26, 2007, 3 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Lee, Cullen E. "Computing the Apparent Centroid of Radar Targets", Sandia National Laboratories; Presented at the Proceedings of the 1996 IEEE National Radar Conference: Held at the University of Michigan; May 13-16, 1996; retrieved from https://www.osti.gov/scitech/servlets/purl/218705 on Sep. 24, 2017, 21 pages.
Lien, Jaime et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, Hermino et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016)pp. 151-160, XP035898949, ISSN: 0925-1030, DOI: 10.1007/S10470-016-0747-8, Apr. 23, 2016, 10 pages.
Matthews, Robert J. "Venous Pulse", Retrieved at: http://www.rjmatthewsmd.com/Definitions/venous_pulse.htm—on Nov. 30, 2016, Apr. 13, 2013, 7 pages.
Nakajima, Kazuki et al., "Development of Real-Time Image Sequence Analysis for Evaluating Posture Change and Respiratory Rate of a Subject in Bed", In Proceedings: Physiological Measurement, vol. 22, No. 3; Retrieved From: <http://iopscience.iop.org/0967-3334/22/3/401/pdf/0967-3334_22_3_401.pdf> Feb. 27, 2015, 8 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.
Patel, P C. et al., "Applications of Electrically Conductive Yarns in Technical Textiles", International Conference on Power System Technology (POWECON), Oct. 30, 2012, 6 pages.
Poh, Ming-Zher et al., "A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, Jan. 1, 2011, 1 page.
Poh, Ming-Zher et al., "Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.
Pu, Qifan et al., "Gesture Recognition Using Wireless Signals", pp. 15-18.
Pu, Quifan et al., "Whole-Home Gesture Recognition Using Wireless Signals", MobiCom '13 Proceedings of the 19th annual international conference on Mobile computing & networking, Aug. 27, 2013, 12 pages.
Schneegass, Stefan et al., "Towards a Garment OS: Supporting Application Development for Smart Garments", Wearable Computers, ACM, Sep. 13, 2014, 6 pages.
Skolnik, Merrill I. "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Stoppa, Matteo "Wearable Electronics and Smart Textiles: A Critical Review", In Proceedings of Sensors, vol. 14, Issue 7, Jul. 7, 2014, pp. 11957-11992.
Wang, Wenjin et al., "Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang, Yazhou et al., "Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana, R et al., "Capacitive Fibre-Meshed Transducer for Touch & Proximity Sensing Applications", IEEE Sensors Journal, IEEE Service Center, Oct. 1, 2005, 5 pages.
Zhadobov, Maxim et al., "Millimeter-wave Interactions with the Human Body: State of Knowledge and Recent Advances", International Journal of Microwave and Wireless Technologies, Mar. 1, 2011, 11 pages.
Zhang, Ruquan et al., "Study of the Structural Design and Capacitance Characteristics of Fabric Sensor", Advanced Materials Research (vols. 194-196), Feb. 21, 2011, 8 pages.
Zheng, Chuan et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Final Office Action", U.S. Appl. No. 15/287,308, dated Feb. 8, 2019, 23 pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 15/287,253, dated Apr. 2, 2019, 10 pages.
"Non-Final Office Action", U.S. Appl. No. 15/166,198, dated Feb. 21, 2019, 48 pages.
"Non-Final Office Action", U.S. Appl. No. 15/287,394, dated Mar. 22, 2019, 39 pages.
"Notice of Allowance", U.S. Appl. No. 15/286,495, dated Jan. 17, 2019, 5 pages.

(56) References Cited

OTHER PUBLICATIONS

"Notice of Allowance", U.S. Appl. No. 15/595,649, dated Jan. 3, 2019, 5 pages.
"Notice of Allowance", U.S. Appl. No. 15/142,829, dated Feb. 6, 2019, 8 pages.
"Notice of Allowance", U.S. Appl. No. 14/504,137, dated Feb. 6, 2019, 9 pages.
"Notice of Allowance", U.S. Appl. No. 15/286,152, dated Mar. 5, 2019, 23 pages.
"Notice of Allowance", U.S. Appl. No. 15/286,837, dated Mar. 6, 2019, 7 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Pre-Interview Communication", U.S. Appl. No. 15/917,238, dated May 1, 2019, 6 pages.
"Pre-Interview Communication", U.S. Appl. No. 15/703,511, dated Feb. 11, 2019, 5 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
Garmatyuk, et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Geisheimer, et al., "A Continuous-Wave (CW) Radar for Gait Analysis", IEEE 2001, 2001, 5 pages.
"Final Office Action", U.S. Appl. No. 14/959,901, dated May 30, 2019, 18 pages.
"First Action Interview Office Action", U.S. Appl. No. 15/917,238, dated Jun. 6, 2019, 6 pages.
"International Preliminary Report on Patentability", PCT Application No. PCT/US2017/051663, dated Jun. 20, 2019, 10 pages.
"Non-Final Office Action", U.S. Appl. No. 15/424,263, dated May 23, 2019, 12 pages.
"Non-Final Office Action", U.S. Appl. No. 15/462,957, dated May 24, 2019, 14 pages.
"Notice of Allowance", U.S. Appl. No. 15/287,308, dated Jul. 17, 2019, 17 Pages.
"Notice of Allowance", U.S. Appl. No. 15/352,194, dated Jun. 26, 2019, 8 pages.
"Notice of Allowance", U.S. Appl. No. 15/287,155, dated Jul. 25, 2019, 7 pages.
"Final Office Action", U.S. Appl. No. 15/287,394, dated Sep. 30, 2019, 38 Pages.
"Final Office Action", U.S. Appl. No. 15/462,957, dated Nov. 8, 2019, 10 Pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"Non-Final Office Action", U.S. Appl. No. 15/286,537, dated Sep. 3, 2019, 28 Pages.
"Non-Final Office Action", U.S. Appl. No. 15/791,044, dated Sep. 30, 2019, 22 Pages.
"Non-Final Office Action", U.S. Appl. No. 16/153,395, dated Oct. 22, 2019, 10 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 16/356,748, dated Oct. 17, 2019, 9 Pages.
"Notice of Allowance", U.S. Appl. No. 15/424,263, dated Nov. 14, 2019, 10 Pages.
"Samsung Galaxy S4 Air Gestures", Video retrieved from https://www.youtube.com/watch?v=375Hb87yGcg, May 7, 2013, 4 pages.
"Non-Final Office Action", U.S. Appl. No. 16/252,477, dated Jan. 10, 2020, 13 Pages.

* cited by examiner

300 

302
Detect a first input by the computing device involving a first gesture performed by a first hand of a user

304
Detect a second input by the computing device involving a second gesture performed by a second hand of the user

306
Control performance of one or more operations by the computing device in which the first input defines an amount of scale to be used in performance of the one or more operations and the second input defines the operations to be performed

FIG. 3

502
Enter a gesture recognition mode responsive to inputs resulting from detection by the three dimensional object detection system of a first gesture made by a first hand of a user

504
Cause performance of one or more operations of the computing device responsive to inputs resulting from detection by the three dimensional object detection system of a second gesture made by a second hand of the user while in the gesture recognition mode

FIG. 5

802
Cause performance of a first operation by the computing device responsive to detection by the three dimensional object detection system of a collection of inputs involving identification, orientation, or movement of one or more hands of a user within a threshold distance

804
Cause performance of a second operation that is different than the first operation responsive to detection by the three dimensional object detection system of the collection of inputs involving the identification, orientation, or movement of the one or more hands of the user that is not within the threshold distance

*FIG. 8*

GESTURE DETECTION AND INTERACTIONS

PRIORITY APPLICATIONS

This application is a continuation of and claims priority to U.S. patent application Ser. No. 14/874,955 titled "Gesture Detection and Interactions", filed Oct. 5, 2015, which, in turn, claims priority under 35 U.S.C. § 119(e) to U.S. Patent Application Ser. No. 62/167,209 titled "Gestures Detection and Interactions", filed May 27, 2015, the disclosure of which is incorporated by reference herein in its entirety.

BACKGROUND

Gestures have been developed as a way to expand functionality available via a computing devices in an intuitive manner. Gestures detected using touchscreen functionality of a computing device, for instance, may be used to mimic real world user interactions, such as to scroll through a webpage using a pan gesture, swipe to turn a page in a book, and so forth.

As the ways in which gestures may be detected has expanded, however, so to have the challenges in supporting interaction using these gestures. In one such example, techniques have been developed to recognize gestures in three dimensions, such that a user may perform actions that are recognized as a gesture without physically touching the computing device. Accordingly, these gestures may be difficult to detect, distinguish from actions that are not intended as gestures, and determine a context for the gestures.

SUMMARY

Gesture detection and interaction techniques are described. Object detection used to support the gestures may be accomplished in a variety of ways, such as by use of radio waves as part of a radar technique. Through use of radio waves, a variety of gestures may be detected, even through an article of clothing worn by or associated with a user, e.g., from a user's pocket, purse, briefcase, gym bag, and so on. In a first example, the techniques are implemented such that one hand of a user sets a context for a gesture that is defined by another hand of the user. In another example, detection of distance is used such that the same motions may be used to different between operations performed. In a further example, split gestures are supported. A gesture, for instance, may be defined at least in part through interaction with a touchscreen device with one hand and detected using a three dimensional object detection system (e.g., radar techniques) with another hand. In another instance, entry into a gesture recognition mode may be implemented through touch and then recognized through three-dimensional orientation and motion of that hand or another. Thus, a variety of gesture detection techniques may be leveraged to increase an amount of gesture available to a user, further discussion of which is described in the following.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 depicts a system and FIG. 3 depicts a procedure in an example implementation in which a first input defines an amount of scale to be used in performance of the one or more operations and the second input defines the operations to be performed.

FIG. 4 depicts a system and FIG. 5 depicts a procedure in an example implementation in which a gesture recognition mode is used to aid in disambiguation of user inputs.

FIG. 7 depicts a system and FIG. 8 depicts a procedure in an example implementation in which distance at which a gesture is performed is used to differentiate between operations performed in response to the gesture.

DETAILED DESCRIPTION

Overview

Figure 1:
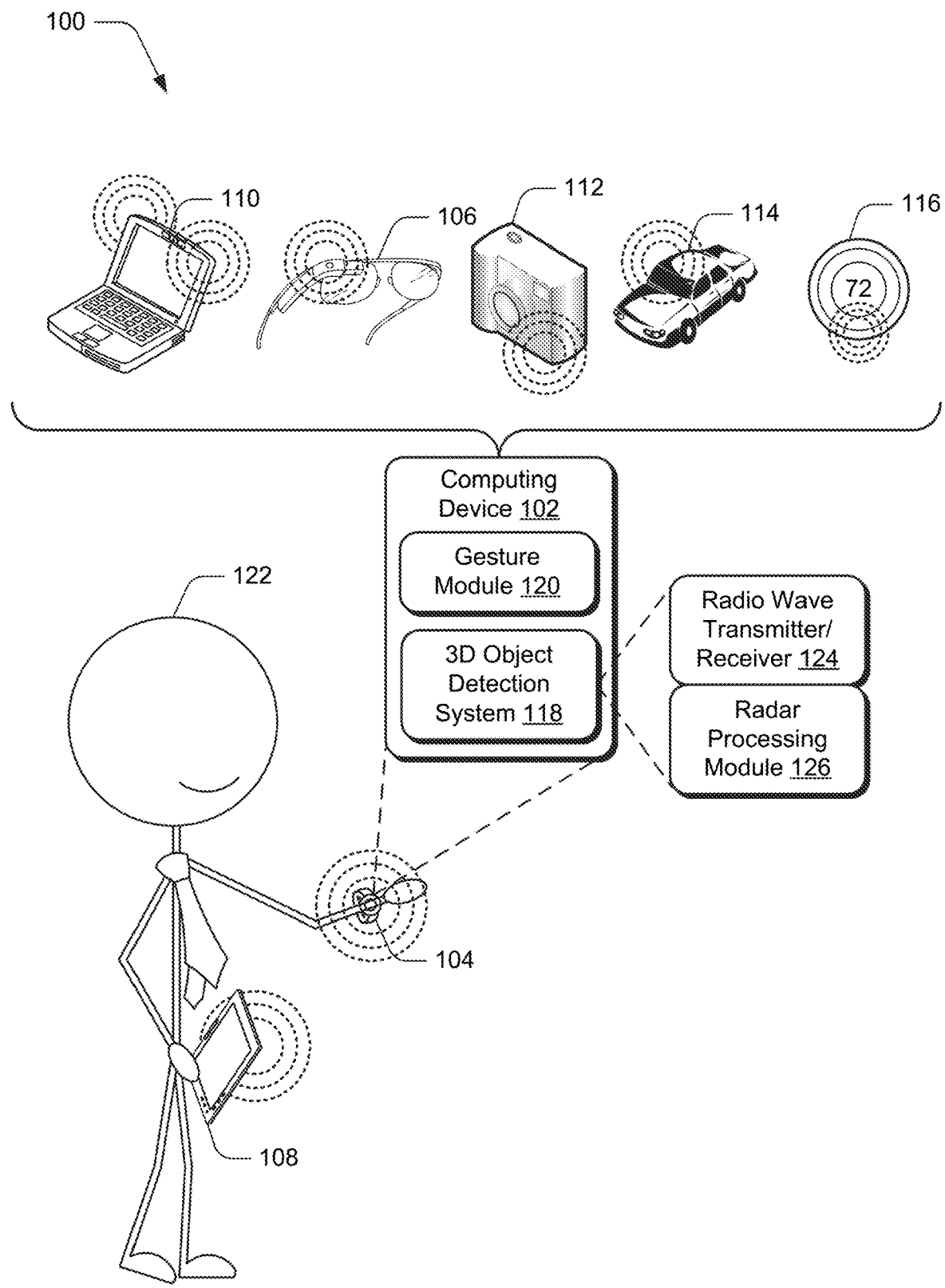
FIG. 1 is an illustration of an environment in an example implementation that is operable to perform gesture detection and interaction techniques described herein.

Interactions in three-dimensional space with a device may be difficult using conventional techniques because the device is not given a context for the user's intended interaction. This may cause limitations in an amount of gestures recognized by the device and thus may be confusing for the user due to instances in which the same gesture may be used for multiple purposes, may result in advertent inputs due to the device's inability to disambiguate between performance of intended and unintended gestures, and so forth.

Techniques are described to support gesture detection and interactions, which may be performed at least in part in a three-dimensional space. Object detection used to support the gestures may be accomplished in a variety of ways, such as by using radio waves as part of a radar technique. Through use of radio waves, a variety of gestures may be detected, even through an article of clothing worn by or associated with a user, e.g., from a user's pocket, purse, briefcase, gym bag, and so on as described in relation to FIGS. 11-12.

In a first example, the techniques are implemented such that one hand of a user sets a context for a gesture that is defined by another hand of the user. In this way, a computing device may be used to disambiguate between gestures made by a hand using a context specified by another hand. The user, for instance, may set an amount of scale (e.g., a scaling factor) by raising a left hand up or down that is applied to a twisting motion performed by the user's right hand. This may be used to adjust volume, navigate through a document and so on quickly and with increased accuracy, further discussion of which is described in relation to FIGS. 2-3.

In another example, a gesture recognition mode is utilized. A user, for instance, may make a gesture with a hand to enter a gesture recognition mode. While in the mode, the user may make other gestures with another hand that may then be recognized by the computing device. In this way, an amount of available gestures may be expanded by providing the computing device with an ability to disambiguate between when a user intends to input a gesture and when a user does not, further discussion of which is described in relation to FIGS. 4-5.

In yet another example, detection of distance is used such that the same motions may be used to differentiate between operations performed. A user, for instance, may make a pinch motion relatively close to a device to "pick up" (i.e., select) an item displayed on the display device and make the same pinching motion past a threshold distance in order to adjust a display scale of a user interface displayed by the device. In this way, an amount of available gestures may also be expanded by providing the computing device with an ability to disambiguate between gestures based on distance, further discussion of which is described in relation to FIGS. 7-8.

In a further example, split gestures are supported. A gesture, for instance, may be defined at least in part through interaction with a touchscreen device with one hand and detected using a three dimensional object detection system (e.g., radar techniques) with another hand. In another instance, entry into a gesture recognition mode may be implemented through touch and then recognized through three-dimensional orientation and motion of that hand or another. Thus, a variety of gesture detection techniques may be leveraged to increase an amount of gesture available to a user, further discussion of which is described in relation to FIGS. 9-10.

In the following discussion, an example environment is described that may employ the gesture techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ gesture detection, recognition, and interaction techniques described herein. The illustrated environment 100 includes a computing device 102, which is configurable in a variety of ways.

The computing device 102, for instance, may be configured as a wearable device having a housing 104 that is configured to be worn by or attached to a user. As such, the housing of the wearable device may take a variety of different forms, such as a ring, broach, pendant, configured to be worn on a wrist of a user as illustrated, glasses 106 as also illustrated, and so forth. The computing device 102 may also be configured to include a housing 108 configured to be held by one or more hands of a user, such as a mobile phone or tablet as illustrated, a laptop 110 computer, a dedicated camera 112, and so forth. Other examples include incorporation of the computing device 102 as part of a vehicle 114 (e.g., plane, train, boat, aircraft, and balloon), as part of the "Internet-of-things" such as a thermostat 116, appliance, vent, furnace, and so forth. Additional forms of computing devices 102 include desktop computers, game consoles, media consumption devices, televisions, and so on.

Thus, the computing device 102 ranges from full resource devices with substantial memory and processor resources (e.g., personal computers, game consoles) to a low-resource device with limited memory and/or processing resources (e.g., wearables). Although single computing device examples are shown, a computing device may be representative of a plurality of different devices (e.g., a television and remote control) as further described in relation to FIG. 16.

The computing device 102, regardless of configuration, is configured to include a three dimensional (3D) object detection system 118 and a gesture module 120. The gesture module 120 is representative of functionality to identify gestures made by a user 122 (e.g., either directly by the user and/or with an object) to initiate operations to be performed by the computing device 102. For example, the gesture module 120 may receive inputs that are usable to detect attributes to identify an object, orientation of the object, and/or movement of the object. Based on recognition of a combination of one or more of the attributes, the gesture module 120 may cause an operation to be performed, such as to detect a rightward swipe by a user's hand and cause a user interface output by the computing device 102 to move a corresponding direction.

The 3D object detection system 118 is configurable to detect objects in three dimensions, such as to identify the object, an orientation of the object, and/or movement of the object. The detection may be performed using a variety of different techniques, such as cameras (e.g., a time-of-flight camera), sound waves, and so on. In the illustrated example, the 3D object detection system 118 is configured to use radar techniques and radio waves through use of a radio wave transmitter/receiver 124 and a radar processing module 126. The radio wave transmitter/receiver 124, for instance, transmits radio waves in the radio frequency range corresponding to one or more Wi-Fi frequency bands, e.g., IEEE 802.11 and so forth. The radar processing module 126 then detects return of these radio waves to detect objects, which may be performed at a resolution of less than one centimeter.

Through use of radio waves, the 3D object detection system 118 may detect objects that are located behind other objects, e.g., are least partially obscured from "view" by another object. The 3D object detection system 118 may also transmit through materials such as fabric and plastics and even through a housing of the computing device 102 itself such that the housing may be made with lower cost and increased protection against outside elements. These techniques may also be leveraged to detect gestures while the computing device 102 is the user's 122 pocket as further described below. Complementary detection techniques may also be used, such as for the radar processing module 126 to leverage inputs from a plurality of computing devices, such as a watch and phone as illustrated, to detect as a gesture. In the following, a variety of gesture detection and interaction techniques are described, which may be implemented using radar or other object detection techniques.

Figure 2:
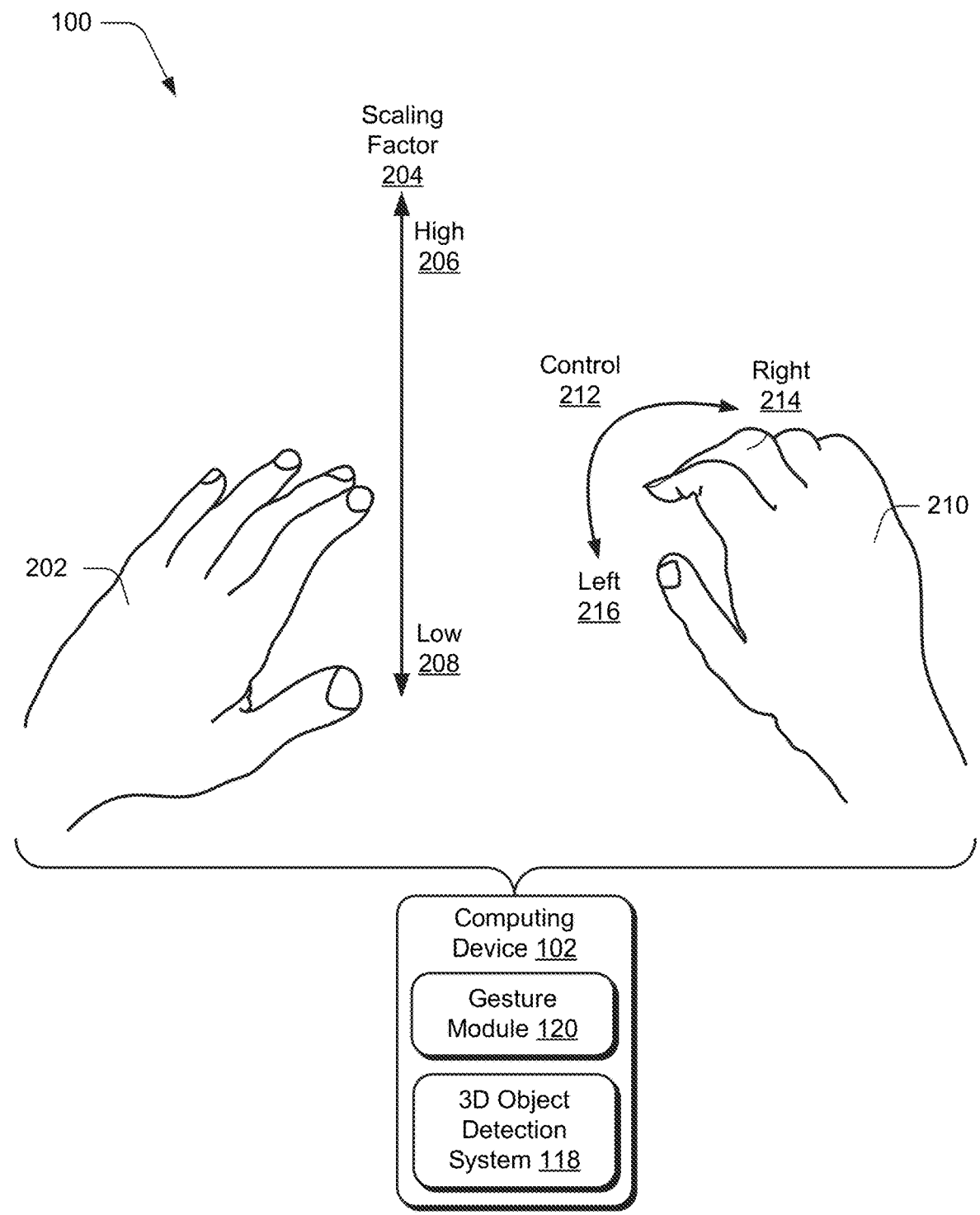

FIG. 2 depicts a system 200 and FIG. 3 depicts a procedure 300 in an example implementation in which a first input defines an amount of scale to be used in performance of the one or more operations and the second input defines the operations to be performed. In the following, reference is made interchangeably to both FIGS. 2 and 3.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

A first input is detected by the computing device 102 involving a first gesture performed by a first hand 202 of a user (block 302). The 3D objection detection system 118, for instance, may detect a first hand 202 of a user 122 of FIG. 1 in three dimensional space, e.g., using a radar technique. The first hand 202 of the user is used to perform a gesture to specify relative amounts of a scaling factor 204, e.g., high 206 to low 208 as illustrated using the arrow. The gesture module 120, for instance, recognizes from inputs of the 3D object detection system 118 that the first hand is positioned palm down and the fingers are relatively flat and thus is used to define the scaling factor 204. The gesture module 120 also recognizes a relative height of the hand 202 and associates a corresponding amount of the scaling factor.

A second input is also detected by the computing device 102 as involving a second gesture performed by a second hand 210 of the user (block 304). Like above, the 3D objection detection system 118 detects a second hand 210 of a user 122 of FIG. 1 in three dimensional space using a radar technique. The second hand 210 of the user in this instance is illustrated as making a motion that mimics grasping of a physical control knob to make a control 212 gesture, to move right 214 to left 216 by twisting right or left.

Performance of one or more operations by the computing device 102 is controlled in which the first input defines an amount of scale to be used in performance of the one or more operations and the second input defines the operations to be performed (block 306). Continuing with the previous example, the gesture module 120 detects the gestures by the first and second hands 202, 210 in which the first hand 202 sets an amount of scale (i.e., scaling factor 204) to be applied to an operation defined by the second hand 210, e.g., to provide control in a manner similar to interaction with a physical knob.

This may be used to initiate operations including navigation forward or back through a user interface, scrolling, zoom, adjust volume, contrast, turn a channel (e.g., radio or television), and any other operation controllable using a physical knob. Thus, by raising the first hand 202 high 206 a scaling factor applied to a right 214 twist by the second hand 210 is increased and by lowering the first hand 202 the scaling factor is decreased. In order to navigate through a document, for instance, a control 212 twisting motion to the right 214 by the second hand 210 may be used to move forward through the document and the scaling factor 204 specified by the first hand 202 defines a number of pages involved in that motion. In this way, the first hand 202 is usable to set a context of a gesture that is identified from inputs associated with the second hand 210 of the user. Other examples of context are also contemplated, such as to enter a gesture mode usable to disambiguate intended from unintended gestures as described in the following.

Figure 4:
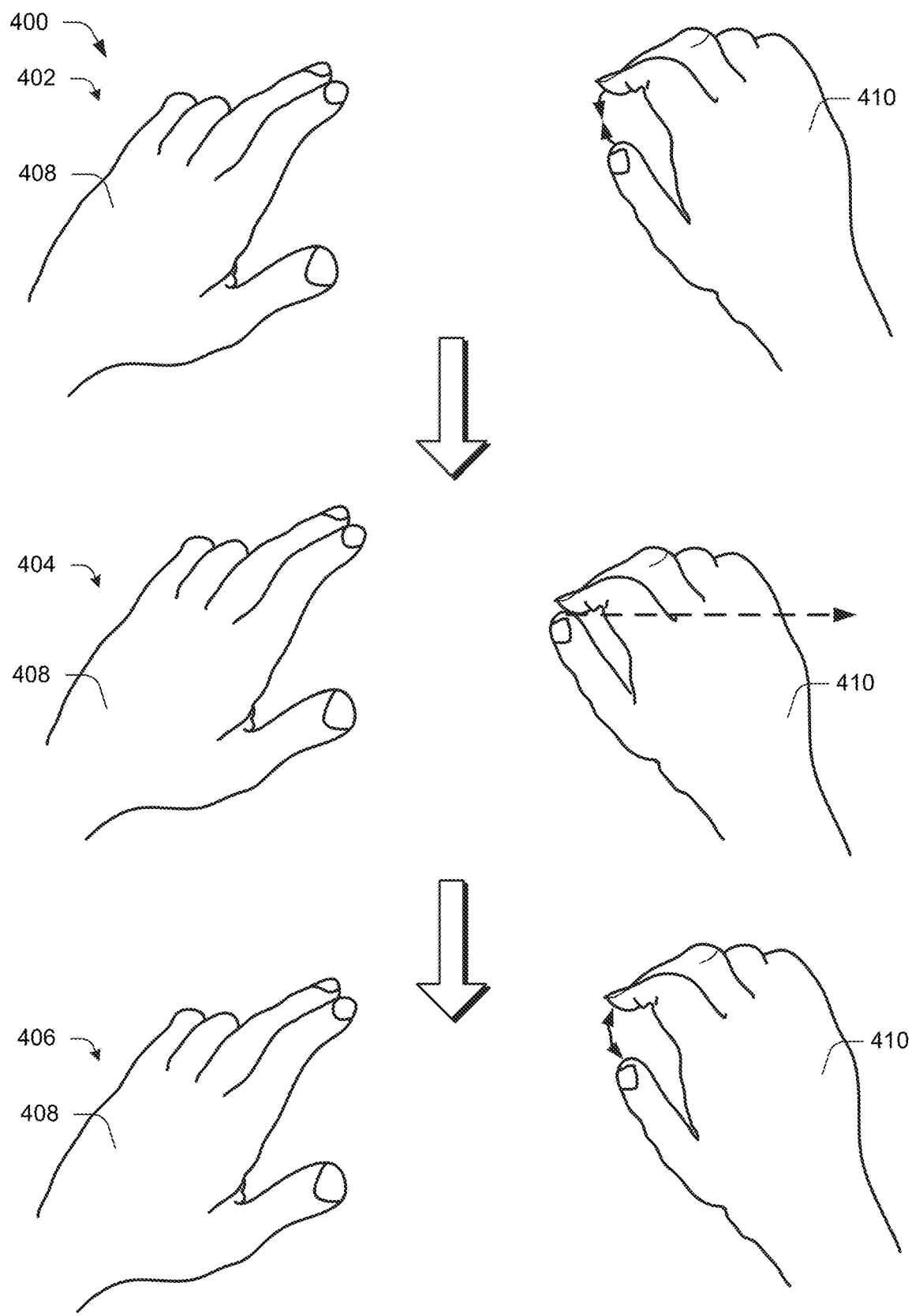

FIG. 4 depicts a system 400 and FIG. 5 depicts a procedure 500 in an example implementation in which a gesture recognition mode is used to aid in disambiguation of user inputs. In the following, reference is made interchangeably to both FIGS. 4 and 5.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

One of the challenges in devices that support detection of gestures in three dimensions is to differentiate between motions that are desired by a user to initiate an operation and those that are not. Due to this, conventional techniques often limited a number of gestures that are made available, thereby limiting functionality of the computing device 102 as a whole. In the techniques described herein, however, a gesture recognition mode is utilized to expand a number of gestures available as well as accuracy in recognition of those gestures.

Accordingly, a gesture recognition mode is entered responsive to inputs resulting from detection by the 3D object detection system of a first gesture made by a first hand of a user (block 502). Performance of one or more operations of the computing device is caused responsive to inputs resulting from detection by the three dimensional object detection system of a second gesture made by a second hand of the user while in the gesture recognition mode (block 504).

FIG. 4 illustrates an example of this technique using first, second, and third stages 402, 404, 406. At the first stage 402, a first hand 408 of a user performs a gesture (e.g., involving two finger pointing outward as illustrated) that is detected by the 3D object detection system 118 and recognized by the gesture module 120 of FIG. 1 as a first gesture to initiate entry into the gesture recognition mode.

Once in the gesture recognition mode, a second hand 410 of the user initiates a measuring gesture by making a pinching motion as illustrated using arrows at the first stage 402. At the second stage 404, the pinch is maintained while the second hand 410 is moved a desired distance to be measured, which is then released at the third stage 406 by "un-pinching" the fingers to cause the computing device 102 to measure the distance. Thus, through use of the gesture recognition mode a number of gestures made available may be increased by recognizing a context of when a user desires input of the gestures and when a user does not. This allows the computing device 102 to disambiguate intended gestures from a user just "waving their hands."

In the illustrated example, the first hand 408 of the user continues the first gesture (e.g., pointing with two fingers) to cause the computing device 102 to remain in the gesture recognition mode until released by the first hand 406, e.g., by no longer orienting the fingers in the illustrated manner other examples are also contemplated, such as to enter and remain in the mode until a gesture is recognized and then automatically exiting the mode such that recognition of completion of a gesture by either of the first or second hands 408, 410 of the user causes exit from the gesture recognition mode. Thus, efficiency of consumption of resources of the computing device 102 may be increased through use of the gesture recognition mode by supporting recognition of these other gestures while in the mode but not perform the detection for the gestures when not in this mode.

Figure 6:
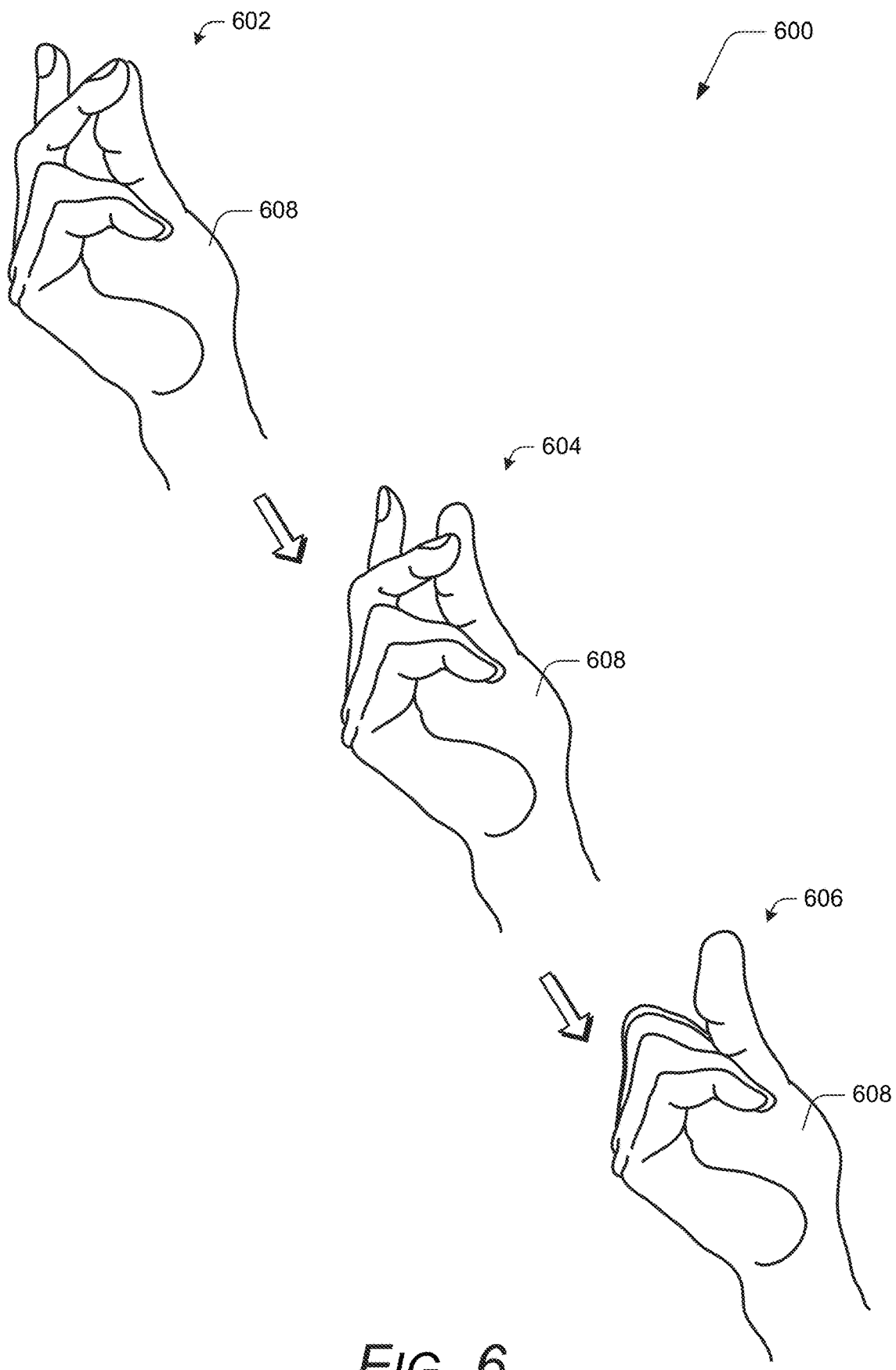
FIG. 6 depicts a system in an example implementation in which stages of a gesture are used to establish entry into a gesture, test a status of the gesture, and perform the gesture.

FIG. 6 depicts a system 600 in an example implementation in which stages of a gesture are used to establish entry into a gesture, test a status of the gesture, and perform the gesture. The system 600 is illustrated using first, second, and third stages 620, 604, 606. In some instances, initiation and performance of a gesture may be potentially sudden and jarring to a user using conventional technique, such as to change a sound volume. In conventional techniques, a user directly enters performance of operations associated with the gestures immediately and typically initiates the change, which could cause an output volume to change rapidly and startle a user. Accordingly, the techniques described herein may leverage stages of performance of a gesture to perform corresponding operations without these drawbacks, which is controlled using definable parts of a single motion by a user's hand 608 in order to make a snapping motion.

At the first stage 602, for instance, fingers of a user's hand are poised, which is recognized by the gesture module 120 as grabbing a control associated with a gesture to change a volume. Thus, the gesture module 120 is made aware that the user wishes to perform this change but does not yet begin to do so.

At the second stage 604, the hand 608 of the user begins a snapping motion. This is recognized by the gesture module 120 to initiate an operation to test a current volume level, i.e., "where the volume is at." In this way, the user is made aware of the current volume level.

At the third stage 606, the hand 608 of the user is at a snapped position, which may then be moved up or down to cause the gesture module 120 to change the level of the volume. The user may then release the hand from the snapped position to complete the gesture and cause the volume to remain at a desired level. Thus, in this example distinct parts of performance of a motion by a hand may be used to control operations involved with a gesture.

Figure 7:
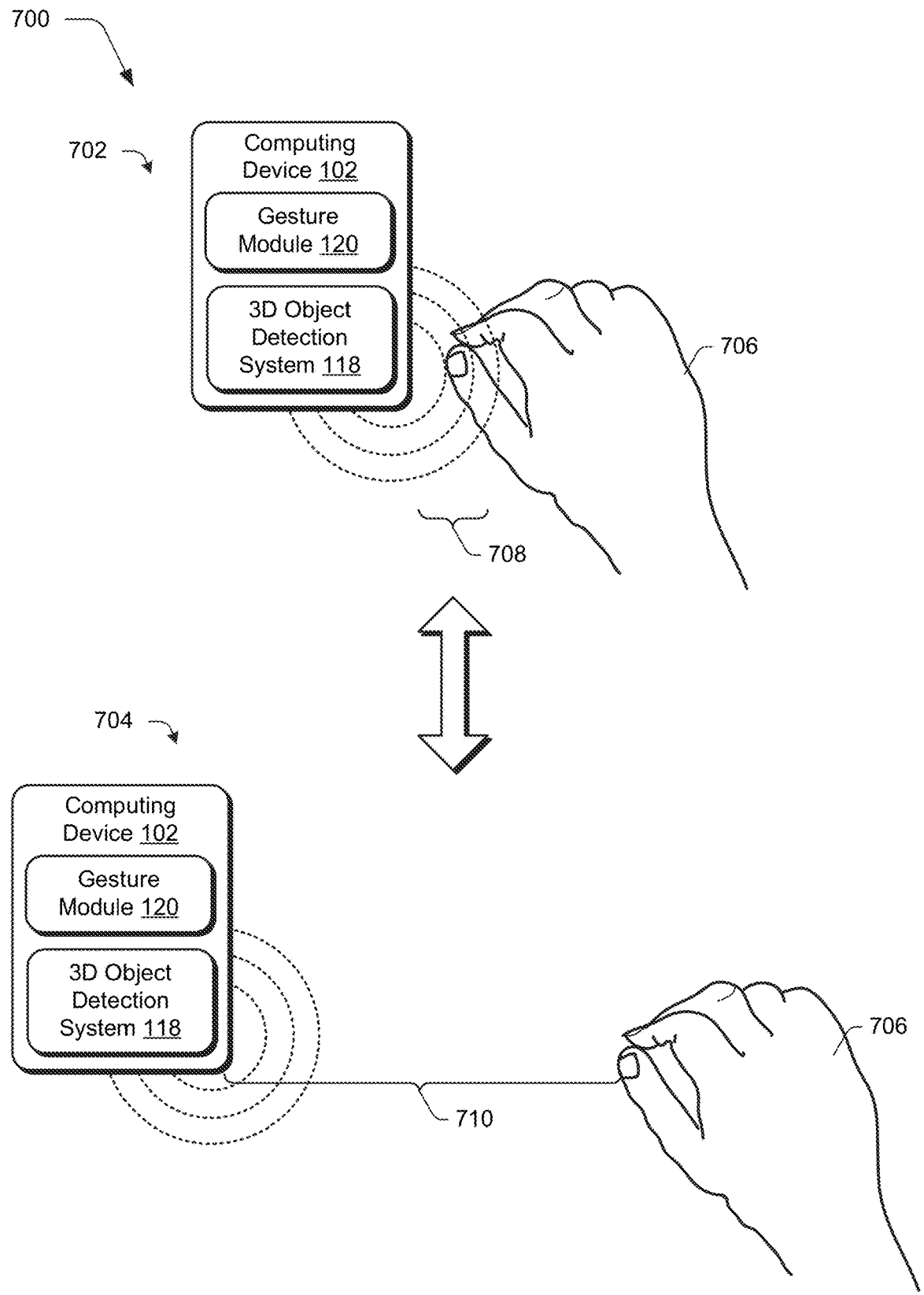

FIG. 7 depicts a system 700 and FIG. 8 depicts a procedure 800 in an example implementation in which distance at which a gesture is performed is used to differentiate between operations performed in response to the gesture. In the following, reference is made interchangeably to both FIGS. 7 and 8.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

As previously described, the 3D object detection system 118 is configured to detect objects, such as to identify the objects, an orientation of the objects, and movement of the objects in three dimensional space. Accordingly, part of this detection includes an ability to determine a relative distance of the object of the 3D object detection system 118, i.e., a "z" distance. In this example, this determination is leveraged to expand a number of operations that may be initiated by gestures.

For example, performance of a first operation is caused by the computing device 102 responsive to detection by the three dimensional object detection system of a collection of inputs involving identification, orientation, or movement of one or more hands of a user within a threshold distance (block 802). As before, the system 700 of FIG. 7 is illustrated using first and second stages 702, 704. At the first stage 702, the 3D object detection system 118 detects that a hand 706 of the user is within a threshold distance 708 from the system.

The gesture module 120 also recognizes a gesture through one or more of identification of the object (e.g., the hand 706), orientation of the object (e.g., a pinch by the fingers), and/or movement of the object, e.g., movement involved in making the pinch gesture 706. The gesture module 120 then initiates an operation based on the collection of inputs as well as the determination of the distance. For example, to select (e.g., cut or copy) display of an image in a user interface by a display device of the computing device 102.

Performance of a second operation is caused by the computing device 102 that is different than the first operation responsive to detection by the three dimensional object detection system of the collection of inputs involving identification, orientation, or movement of the one or more hands of the user that is not within the threshold distance (block 804). As shown at the second stage 704, the 3D object detection system 118 detects that the object (e.g., the hand 706 using a radar technique) is at a distance 710 that is greater than the threshold distance 708 of the first stage 706.

The gesture module 120 also detects the same collection of inputs involving identification, orientation, or movement of the one or more hands of the user, e.g., the pinch gesture in the previous example. However, since the distance is beyond the threshold a different operation is initiated even though the collection of inputs (e.g., the gesture) is the same but for the distance. The gesture module 120, for instance, may initiate a "pinch to zoom" operation to resize a display of the user interface by the computing device 102. In this way, a number of gestures supported by the computing device 102 may be increased by leveraging the determination of distance. The number of gestures may also be increased by leveraging additional input devices of the computing device, an example of which is described in the following.

Figure 9:
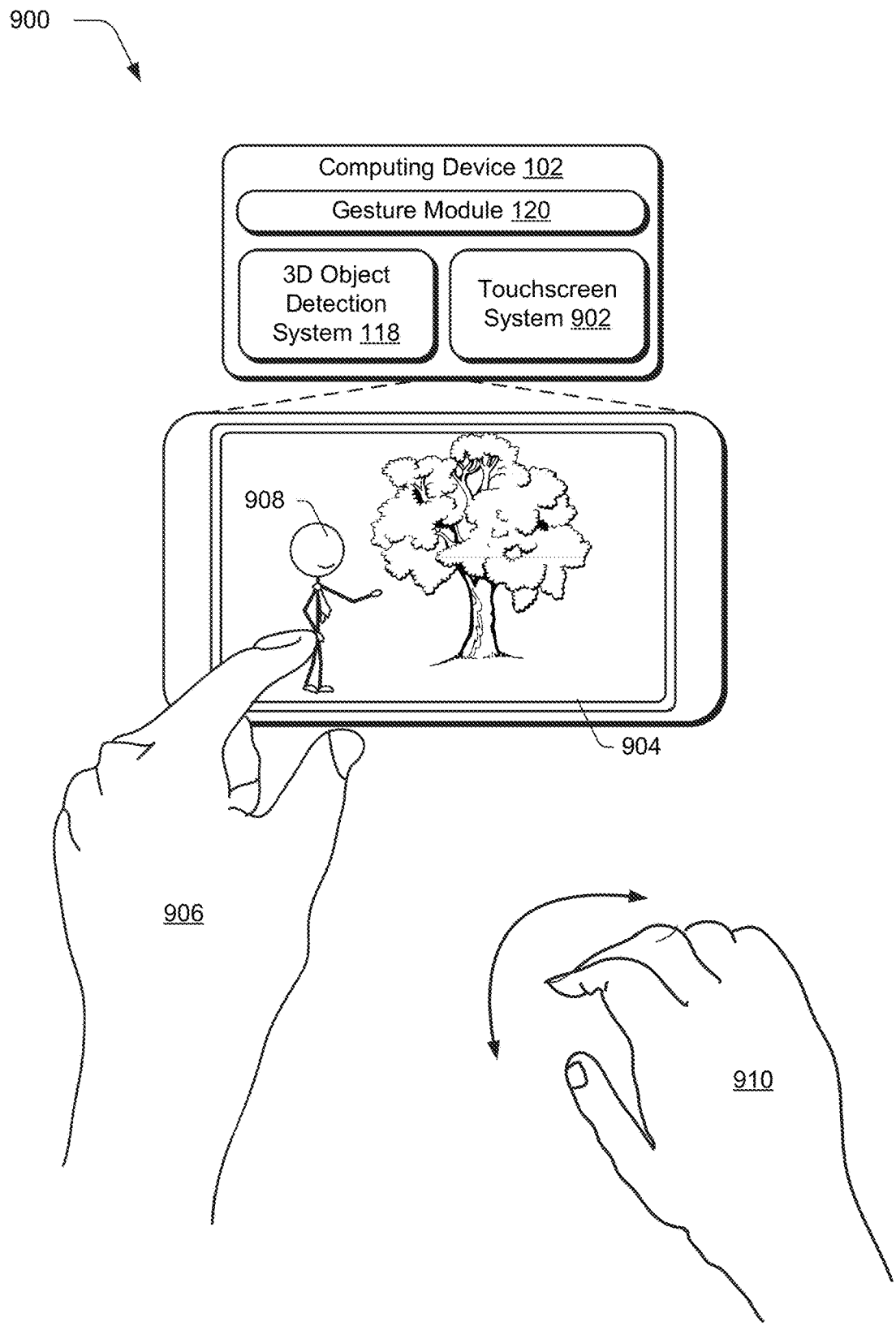
FIG. 9 depicts a system and FIG. 10 depicts a procedure in an example implementation in which a gesture is defined using inputs from a plurality of different input devices.
Figure 10:
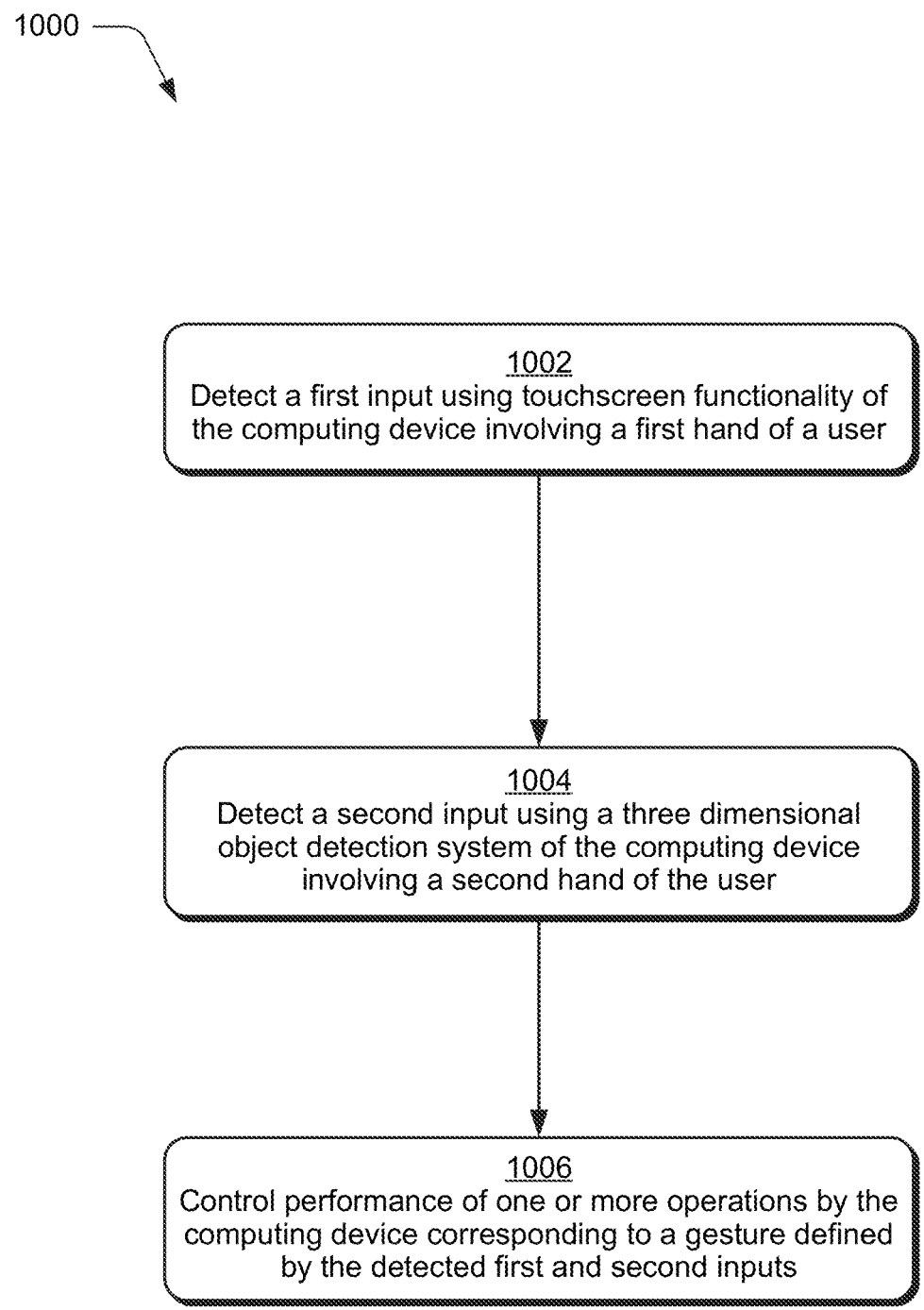

FIG. 9 depicts a system 900 and FIG. 10 depicts a procedure 1000 in an example implementation in which a gesture is defined using inputs from a plurality of different input devices. In the following, reference is made interchangeably to both FIGS. 9 and 10.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

The 3D object detection system 118 may be included in a variety of different computing device 102 configurations as shown and described in relation to FIG. 1. Accordingly, some of these configurations may include input devices in addition to this system, such as a cursor control device (e.g., mouse), keyboard, trackpad, and so forth. Once example of such an input device is a touchscreen system 902 as illustrated in FIG. 9. The touchscreen system 902 is configured as part of a display device 904 to detect proximity of an object to particular locations of the display device 904, such as to detect a finger of a user's hand 906, such as to perform conventional touchscreen gestures. In this example, however, inputs detected by the touchscreen system 902 as used along with inputs detected by the 3D object detection system 118 that are performable without touch to define a gesture that is recognizable by the gesture module 120.

Thus, a first input is detected using touchscreen functionality of the computing device 102 involving a first hand of a user (block 1002). In the illustrated example of FIG. 9, a hand 906 of a user is used to select an image 908 of a person displayed by the display device 904. The selection is detected by a touchscreen system 902, such as through capacitance, resistance, and so forth.

A second input is detected using a three dimensional object detection system of the computing device involving a second hand of the user (block 1004). Continuing with the previous example, the 3D object detection system 118 detect that another hand 910 of the user is performing a twisting motion with the fingers of the hand pinched relatively close together.

Performance of one or more operations is controlled by the computing device corresponding to a gesture defined by the detected first and second inputs (block 1006). The gesture module 120 thus recognizes in this example a subject (e.g., the image 908 of the person) of a motion made by the other hand of the user 910 and performs a corresponding operation, such as to rotate the image 908 as indicated by the other hand 910. A variety of other examples are also contemplated, such as to indicate entry into a gesture recognition mode as descried above via detection by the touchscreen system 902 to recognize gestures made by the other hand 910 of the user that are detected by the 3D object detection system 118.

Figure 11:
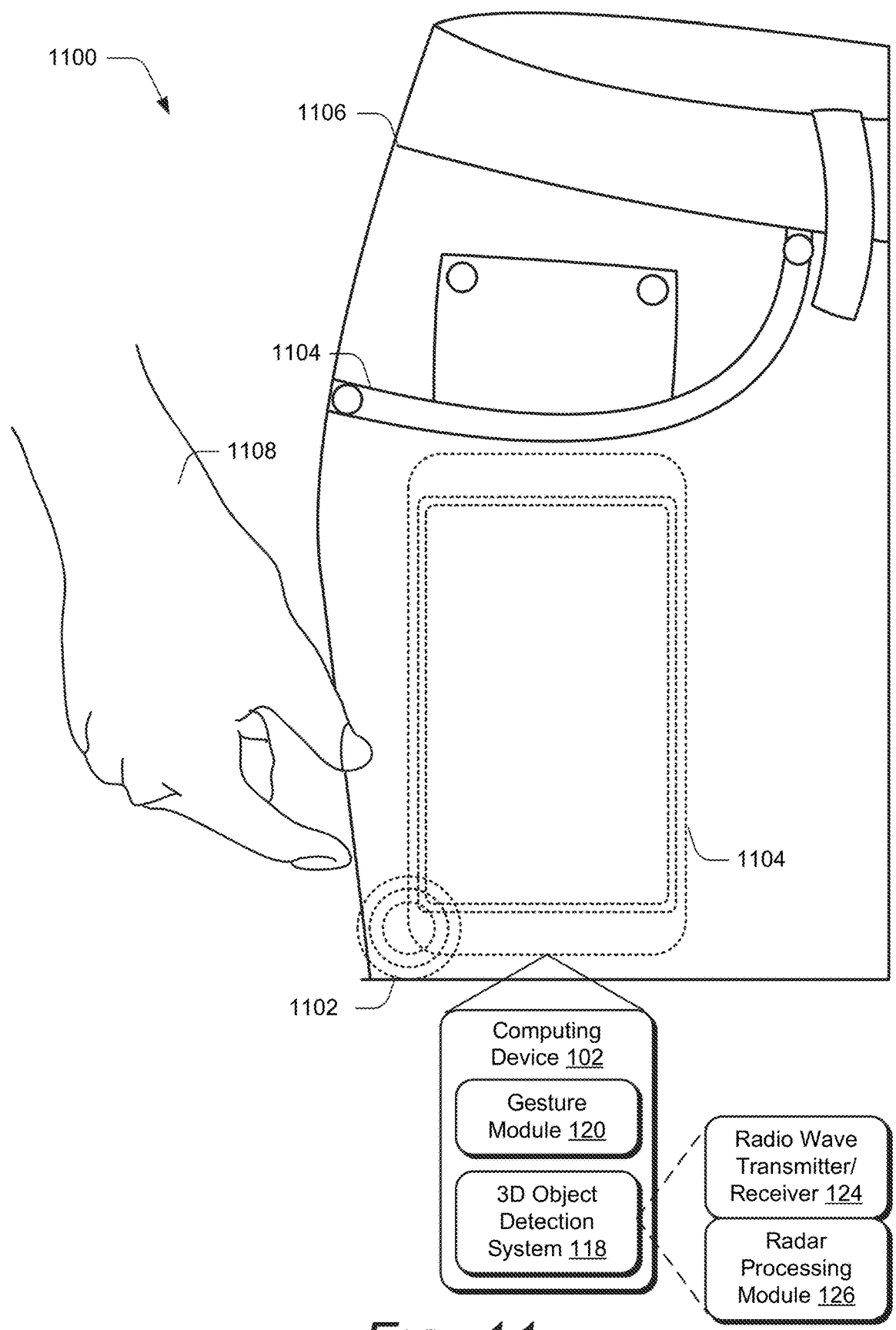
FIG. 11 depicts a system and FIG. 12 depicts a procedure in an example implementation in which a gesture is detected through an article associated with or worn by a user.
Figure 12:
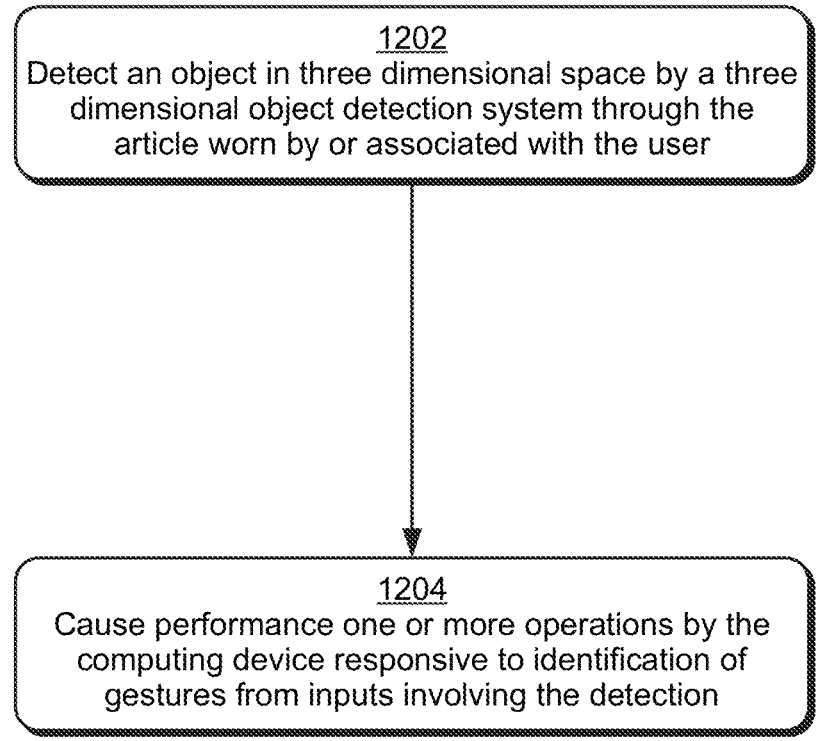

FIG. 11 depicts a system 1100 and FIG. 12 depicts a procedure 1200 in an example implementation in which a gesture is detected through an article associated with or worn by a user. In the following, reference is made interchangeably to both FIGS. 11 and 12.

The following discussion describes techniques that may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks.

The 3D object detection system 118 is configurable in a variety of ways to detect gestures, an example of which is radar techniques performed using a radio wave transmitter/receiver 124 and a radar processing module 126. The radio wave transmitter/receiver 124, for instance, may transmit radio waves 1102 using one or more frequencies that fall within a Wi-Fi frequency band, e.g., in compliance with one or more IEEE 802.11 or other standards. In this example, these radio waves 1102 are of a sufficient strength to pass through fabric or plastic, such as an article worn by (e.g., shirt, pants) or associated with (e.g., a purse, brief case, gym bag, backpack) a user.

In the illustrated instance, the computing device 102 is placed within a front pocket 1104 of jeans 1106 worn by a user 122 of FIG. 1. The 3D object detection system 118 detects an object in three dimensional space through an article worn by or associated with a user (block 1202). The 3D object detection system 118, for instance, uses radar techniques involving radio waves 1102 that pass through the article of clothing to identify and detect an orientation or movement of an object, such as a hand 1108 of a user.

The gesture module 120 then causes performance of one or more operations by the computing device responsive to the identification of gestures from inputs involving the detection (block 1204). The computing device 102, for instance, may be configured as a mobile phone and when the user receives a call, the user may initiate a gesture to silence the phone without even physically touching the phone or removing it from the user's pocket. In another example, gestures may be made to navigate through music being transmitted to wireless headphones by making gestures to navigate forward or back through a playlist. Although described as a mobile phone in this example, these techniques are also applicable to wearable devices such as those having a housing configured to be worn by a user, such that interaction with the device may be supported without requiring the user to actually view or expose the device.

Figure 13:
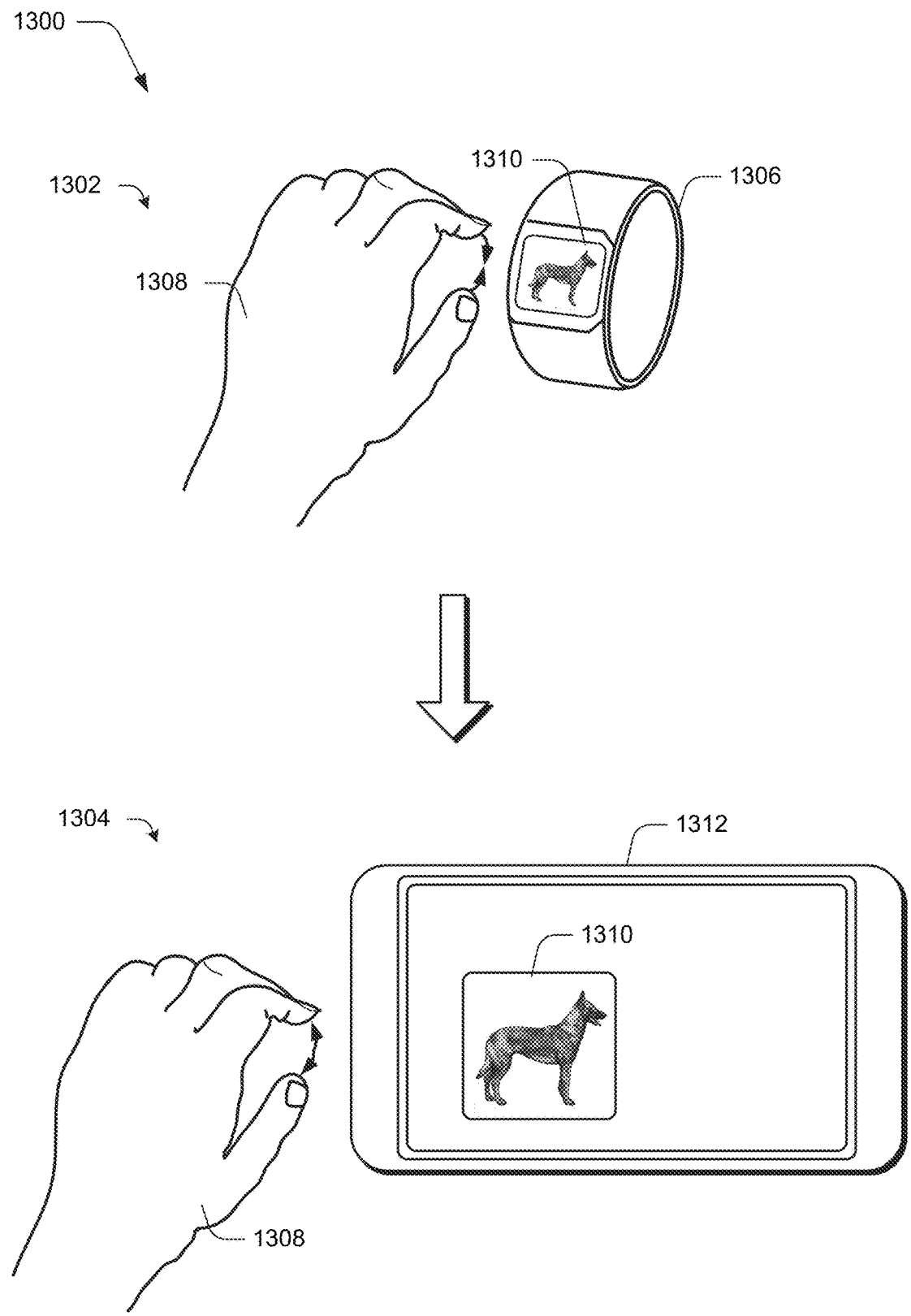
FIG. 13 depicts an example implementation in which content is transferred between devices responsive to a gesture.

FIG. 13 depicts an example implementation 1300 in which content is transferred between devices responsive to a gesture. This implementation 1300 is illustrated using first and second stages 1302, 1304. At the first stage 1302, a gesture module 120 of a computing device 1306 detects a pinch gesture made by a hand of a user 1308. In response, the gesture module 120 causes a display of corresponding content 1310 by the computing device 1306 to be cut or copied.

At the second stage 1304, a gesture module 120 from one or more of the computing device 1306 and/or computing device 1312 detects release of the gesture proximal to computing device 1312. In response, the computing device 1306 causes transfer of the content 1310, which is displayed on a display device of computing device 1312. In another instance, computing device 1312 requests the transfer of the content responsive to detection of the gesture. Computing devices 1306, 1312 may also operate in tandem to cause transfer of the content 1310, such as to detect selection by computing device 1306 and release by computing device 1312. In this way, a user may efficiently control transfer of content between computing devices 1306 1312 in an intuitive manner.

Figure 14:
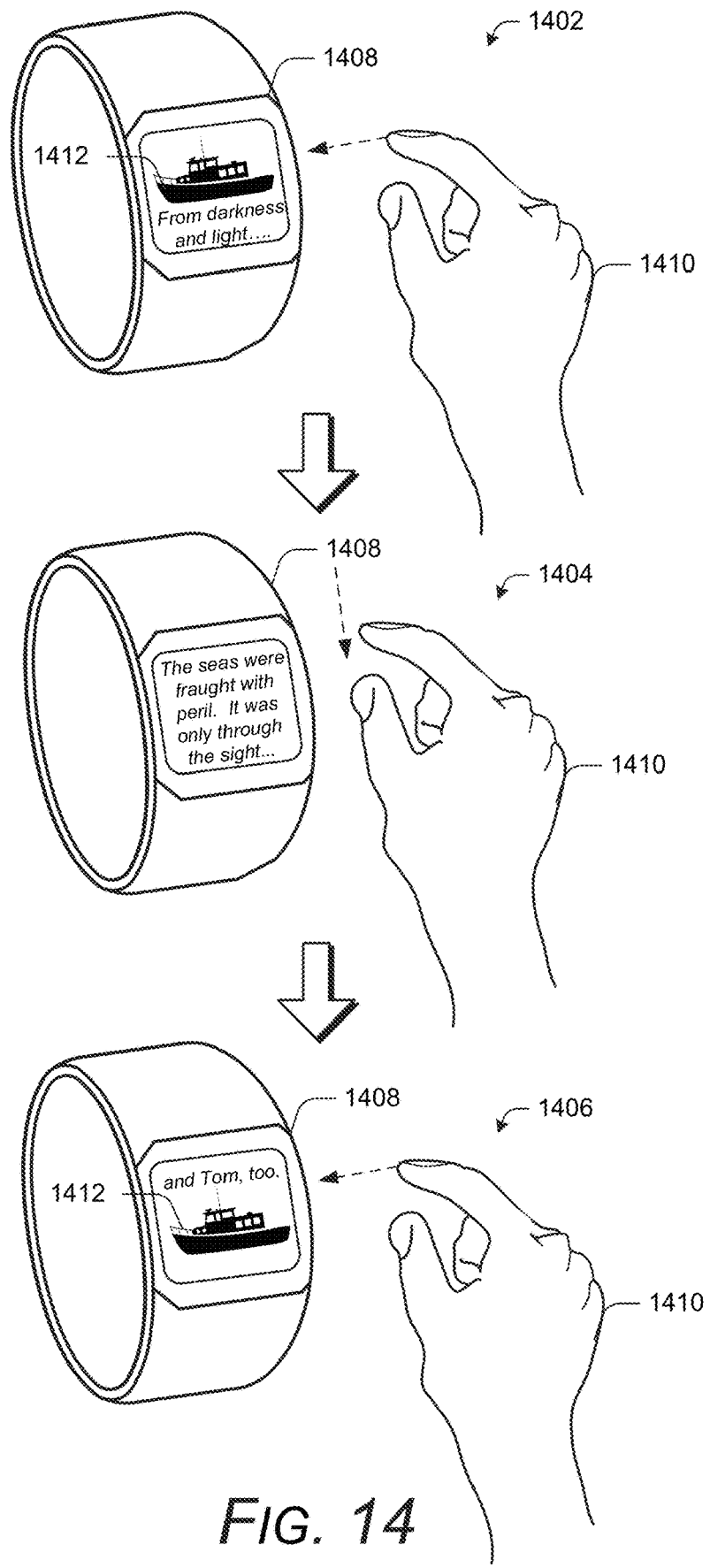
FIG. 14 depicts an example implementation of a cut and paste gesture and corresponding operation.

FIG. 14 depicts an example implementation 1400 of a cut and paste gesture and corresponding operation. This implementation 1400 is illustrated using first second, and third stages 1402, 1404, 1406. At the first stage 1402, a computing device 1408 detects movement of a user's hand 1410 as selecting an item of content 1412. This may be performed in a variety of ways, such as detection of a tap gesture "in the air" by a 3D object detection system 118 and gesture module 120 of the computing device 1408.

At the second stage 1404, another gesture is detected by the computing device 1406 to navigate through a user interface, such as a pan gesture also performed in the air by the user's hand 1410 as illustrated. Once a desired location in the user interface has been reached as shown in the third stage 1406, a tap gesture is repeated by the user's hand 1410 to cause the item of content 1412 to be pasted at that location in the user interface.

Thus, as shown in this example the gestures are performed and detected away from a display of a display device such that the fingers of the user's hand 1410 do not occlude the display device. This permits a user to interact with an entirety of a display area, which may improve user interaction efficiency especially for computing devices having relatively small display devices, e.g., wearables.

Figure 15:
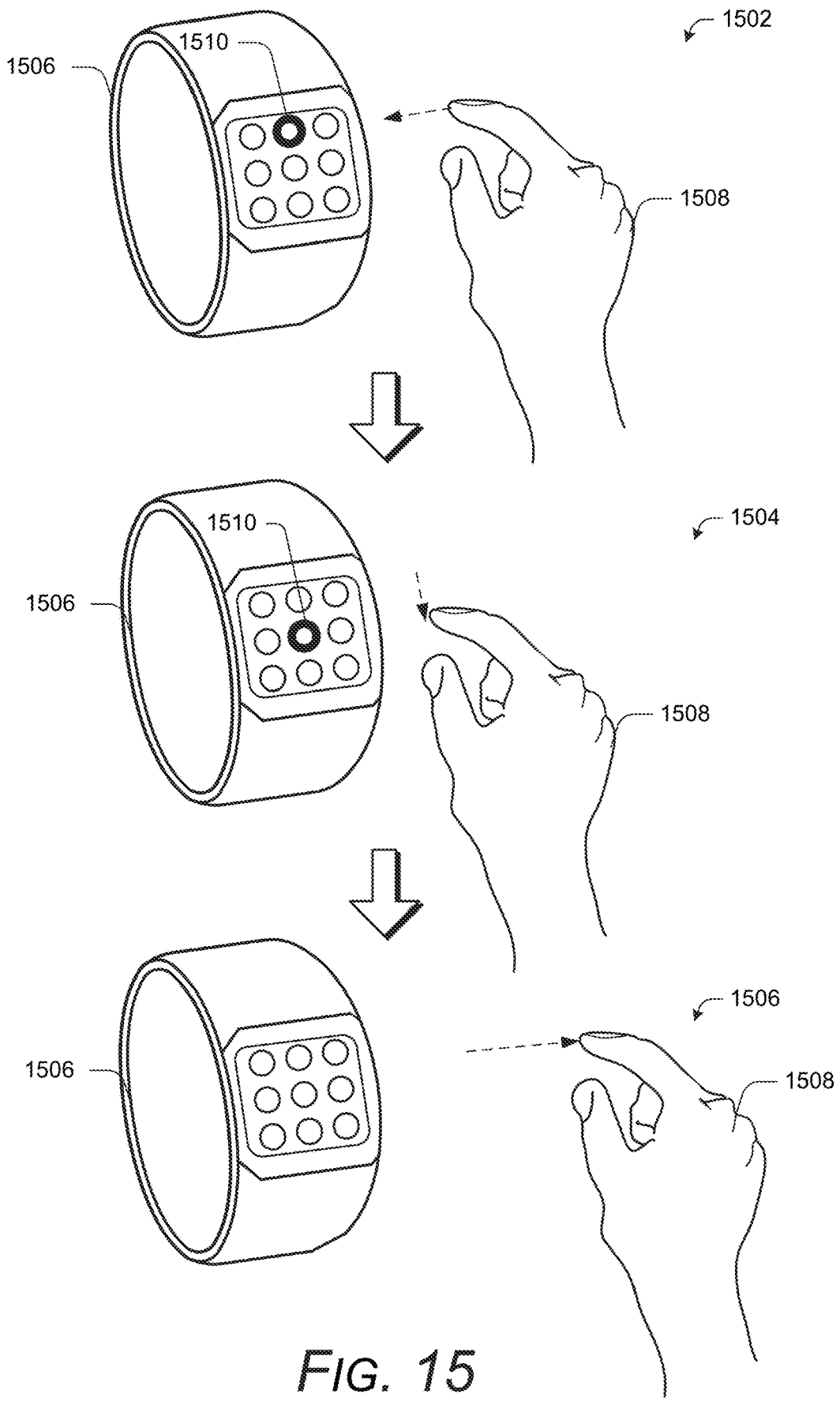
FIG. 15 depicts an example implementation of feedback provided to support a three-dimensional gesture.

FIG. 15 depicts an example implementation 1500 of feedback usable to support a three-dimensional gesture. One of the challenges in supporting a gestures in three-dimensional space is that the gestures do not involve contact and thus it may be difficult for a user to determine "where" in a user interface interaction is to occur. Accordingly, the 3D object detection system 118 and gesture module 120 may be configured to support feedback to aid in this interaction.

The illustrated example is shown using first, second, and third stages 1502, 1504, 1506. At the first stage 1502, a computing device 1506 having a 3D object detection system 118 and gesture module 120 of FIG. 1 detects that a finger of a user's hand 1508 has approached within a predefined threshold distance, e.g., using a radar technique. In response, the gesture module 120 establishes a starting point for user interaction with a user interface displayed by the computing device 1506 and outputs an indication 1510 as feedback.

Subsequent movement of the finger of the user's hand 1508 causes corresponding movement of the indication 1510 as shown as the second stage 1506, and movement of the finger of the user's hand 1508 past the threshold causes the indication 1510 that provides the feedback to be removed. In this way, a user is provided with an efficient and intuitive means to support user interaction without occluding the display device of the computing device 1506 as described above. A variety of other examples are also contemplated without departing from the spirit and scope thereof.

Example Electronic Device

Figure 16:
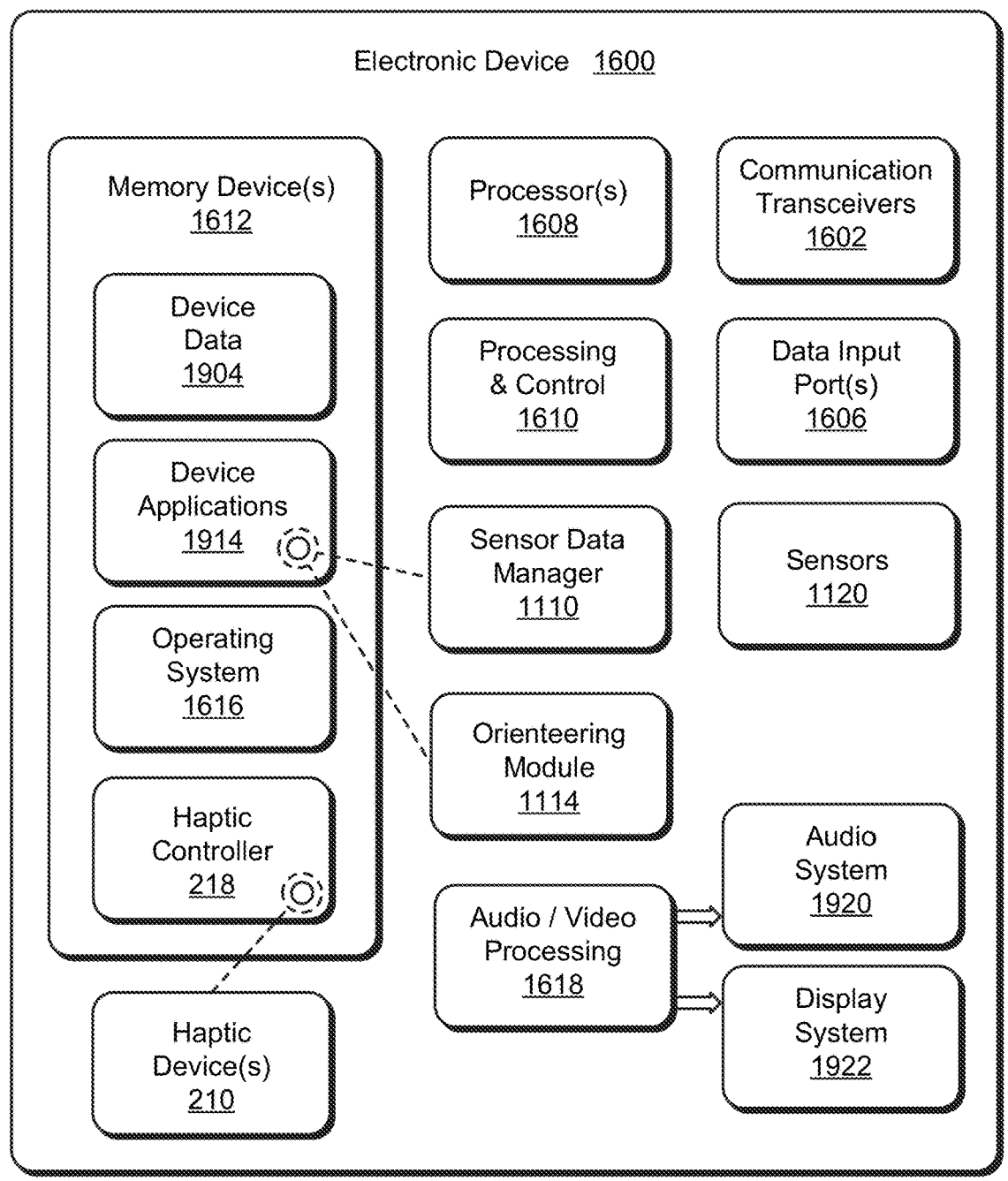
FIG. 16 illustrates an example system including various components of an example device that can be implemented as any type of computing device as described and/or utilize with reference to FIGS. 1-15 to implement embodiments of the techniques described herein.

FIG. 16 illustrates various components of an example electronic device 1600 that can be implemented as a wearable haptic and touch communication device, a wearable haptic device, a non-wearable computing device having a touch-sensitive display, and/or a remote computing device as described with reference to any of the previous FIGS. 1-15. The device may be implemented as one or combination of a fixed or mobile device, in any form of a consumer, computer, portable, user, communication, phone, navigation, gaming, audio, messaging, Web browsing, paging, media playback, and/or other type of electronic device, such as the wearable device 104 described with reference to FIG. 1.

Electronic device 1600 includes communication transceivers 1602 that enable wired and/or wireless communication of device data 1604 and may also support the radar techniques previously described. Other example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

Electronic device 1600 may also include one or more data input ports 1616 via which any type of data, media content, and/or inputs can be received, such as user-selectable inputs, messages, music, television content, recorded video content, and any other type of audio, video, and/or image data received from any content and/or data source. Data input ports 1616 include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

Electronic device 1600 of this example includes processor system 1608 (e.g., any of application processors, microprocessors, digital-signal-processors, controllers, and the like), or a processor and memory system (e.g., implemented in a SoC), which process (i.e., execute) computer-executable instructions to control operation of the device. Processor system 1608 (processor(s) 1608) may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1610 (processing and control 1610). Although not shown, electronic device 1600 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 1600 also includes one or more memory devices 1612 that enable data storage, examples of which include random access memory (RAM), non-volatile memory (e.g., read-only memory (ROM), flash memory, EPROM, EEPROM, etc.), and a disk storage device. Memory device(s) 1612 provide data storage mechanisms to store the device data 1604, other types of information and/or data, and various device applications 1614 (e.g., software applications). For example, operating system 16116 can be maintained as software instructions within memory device 1612 and executed by processors 1608.

Electronic device 1600 also includes audio and/or video processing system 1618 that processes audio data and/or passes through the audio and video data to audio system 1620 and/or to display system 1622 (e.g., spectacles, displays on computing bracelet as shown in FIG. 1, and so on) to output content 118. Audio system 1620 and/or display system 1622 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In some implementations, audio system 1620 and/or display system 1622 are external components to electronic device 1600. Alternatively or additionally, display system 1622 can be an integrated component of the example electronic device, such as part of an integrated touch interface.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of controlling operation of a computing device based on gesture detection, the method comprising:
   determining, via touchscreen functionality of the computing device and without reliance on a three-dimensional object detection system of the computing device, a first input based on a touch-input performed by a first hand of a user selecting an item displayed by the touchscreen functionality;
   determining, via the three-dimensional object detection system without reliance on the touchscreen functionality, a second input based on a three-dimensional gesture performed by a second hand of the user that defines an operation for the item; and
   controlling performance of the operation on the item based on the first and second inputs.

2. The method of claim 1, wherein the three-dimensional object detection system uses radar techniques involving radio waves.

3. The method of claim 2, wherein the radio waves correspond to a frequency band included as part of a Wi-Fi radio spectrum.

4. The method of claim 1, wherein the item comprises an image or text.

5. The method of claim 4, wherein the operation comprises an editing operation for the image or text.

6. The method of claim 1, further comprising entering a gesture recognition mode responsive to the first input, wherein the second input is determined while in the gesture recognition mode.

7. The method of claim 1, wherein the second hand of the user is detected through a fabric or plastic material of an article worn by or carried by the user.

8. The method of claim 1, wherein the computing device comprises a mobile phone or tablet.

9. The method of claim 1, wherein the item corresponds to a remote device and the operation is effective to control the remote device.

10. A method of controlling operation of a computing device based on gesture detection, the method comprising:
    detecting, using a three-dimensional object detection system of the computing device that is configured to detect objects in three-dimensional space, a first collection of inputs involving identification, orientation, or movement of one or more hands of a user within a threshold distance from the computing device;
    causing performance of a first operation by the computing device responsive to the detection of the first collection of inputs;
    detecting, using the three-dimensional object detection system of the computing device, a second collection of inputs involving identification, orientation, or movement of the one or more hands of the user outside the threshold distance from the computing device, the identification, orientation, or movement of the one or more hands of the user associated with the second collection of inputs being similar to the identification, orientation, or movement of the one or more hands of the user associated with the first collection of inputs; and
    causing performance of a second operation by the computing device responsive to the detection of the second collection of inputs the second operation being different than the first operation.

11. The method of claim 10, wherein the three-dimensional object detection system uses radar techniques involving radio waves.

12. The method of claim 11, wherein the radio waves correspond to a frequency band included as part of a Wi-Fi radio spectrum.

13. The method of claim 10, wherein the one or more hands of the user are detected through an article of clothing worn by the user.

14. The method of claim 13, wherein the article of clothing comprises a bag or clothing pocket.

15. The method of claim 10, wherein the computing device comprises a mobile telephone or tablet.

16. The method of claim 10, wherein the computing device comprises a wearable device.

17. The method of claim 10, wherein the one or more hands of the user comprises a single hand of the user.

18. The method of claim 10, wherein the one or more hands of the user comprises two hands of the user.

19. The method of claim 10, wherein a first hand of the user defines a scale for the first or second operation and a second hand of the user defines the first or second operation.

20. The method of claim 10, wherein the first or second operation changes a user interface displayed by the computing device.

21. The method of claim 10, wherein the identification, orientation, or movement of the one or more hands of the user associated with the first and second collection of inputs comprise a same detected gesture.

22. A computing device comprising:
    a three-dimensional object detection system configured to detect objects in three-dimensional space;
    a touchscreen; and
    a gesture module implemented at least partially in hardware, the gesture module configured to:
        determine, via the touchscreen and without reliance on the three-dimensional object detection system, a first input based on a touch-input performed by a first hand of a user selecting an item displayed by the touchscreen;
        determine, via the three-dimensional object detection system without reliance on the touchscreen, a second input based on a three-dimensional gesture performed by a second hand of the user that defines an operation for the item; and
        control performance of the operation on the item based on the first and second inputs.

23. The computing device of claim 22, wherein the three-dimensional object detection system uses radar techniques involving radio waves.

24. The computing device of claim 23, wherein the radio waves correspond to a frequency band included as part of a Wi-Fi radio spectrum.

25. The computing device of claim 22, wherein the item comprises an image or text.

26. The computing device of claim 25, wherein the operation comprises an editing operation for the image or text.

27. The computing device of claim 22, wherein the gesture module is further configured to enter a gesture recognition mode responsive to the first input and wherein the second input is determined while in the gesture recognition mode.

28. The computing device of claim 22, wherein the three-dimensional object detection system is configured to detect the second hand of the user through a fabric or plastic material of an article worn by or carried by the user.

29. The computing device of claim 22, wherein the computing device comprises a mobile phone or tablet.

30. The computing device of claim 22, wherein the item corresponds to a remote device and the operation is effective to control the remote device.

31. A computing device comprising:
    a three-dimensional object detection system configured to detect objects in three-dimensional space; and
    a gesture module implemented at least partially in hardware, the gesture module configured to:
        cause performance of a first operation responsive to detection, by the three-dimensional object detection system, of a first collection of inputs involving identification, orientation, or movement of one or more hands of a user within a threshold distance from the computing device; and
        cause performance of a second operation responsive to detection, by the three-dimensional object detection system, of a second collection of inputs involving identification, orientation, or movement of the one or more hands of the user that is not within the threshold distance from the computing device, the second operation being different than the first operation, the identification, orientation, or movement of the one or more hands of the user associated with the second collection of inputs being similar to the identification, orientation, or movement of the one or more hands of the user associated with the first collection of inputs.

32. The computing device of claim 31, wherein the three-dimensional object detection system uses radar techniques involving radio waves.

33. The computing device of claim 32, wherein the radio waves correspond to a frequency band included as part of a Wi-Fi radio spectrum.

34. The computing device of claim 31, wherein the one or more hands of the user are detected through an article of clothing worn by the user.

35. The computing device of claim 34, wherein the article of clothing comprises a bag or clothing pocket.

36. The computing device of claim 31, wherein the computing device comprises a mobile telephone or tablet.

37. The computing device of claim 31, wherein the computing device comprises a wearable device.

38. The computing device of claim 31, wherein the one or more hands of the user comprises a single hand of the user.

39. The computing device of claim 31, wherein the one or more hands of the user comprises two hands of the user.

40. The computing device of claim 39, wherein a first hand of the user defines a scale for the first or second operation and a second hand of the user defines the first or second operation.

41. The computing device of claim 31, wherein the first or second operation changes a user interface displayed by the computing device.

42. The computing device of claim 31, wherein the identification, orientation, or movement of the one or more hands of the user associated with the first and second collection of inputs comprise a same detected gesture.

* * * * *